US012656777B2

(12) United States Patent
Suzuki et al.

(10) Patent No.: US 12,656,777 B2
(45) Date of Patent: Jun. 16, 2026

(54) AUTOMATED DRIVING SYSTEM FOR WORK VEHICLE

(71) Applicant: Yanmar Power Technology Co., Ltd., Osaka (JP)

(72) Inventors: Akihiro Suzuki, Osaka (JP); Akihiro Nakahata, Osaka (JP); Yoshiharu Mizukura, Osaka (JP); Keita Kitano, Osaka (JP)

(73) Assignee: Yanmar Power Technology Co., Ltd., Osaka (JP)

( * ) Notice: Subject to any disclaimer, the term of this patent is extended or adjusted under 35 U.S.C. 154(b) by 750 days.

(21) Appl. No.: 17/620,699

(22) PCT Filed: Jun. 17, 2020

(86) PCT No.: PCT/JP2020/023848
§ 371 (c)(1),
(2) Date: Dec. 19, 2021

(87) PCT Pub. No.: WO2020/256033
PCT Pub. Date: Dec. 24, 2020

(65) Prior Publication Data
US 2022/0244731 A1      Aug. 4, 2022

(30) Foreign Application Priority Data

Jun. 20, 2019    (JP) ................................. 2019-114955

(51) Int. Cl.
G05D 1/00          (2024.01)
A01D 46/04        (2006.01)
(Continued)

(52) U.S. Cl.
CPC ............. G05D 1/0212 (2013.01); G01C 9/02 (2013.01); G01S 19/13 (2013.01); G01S 19/43 (2013.01);
(Continued)

(58) Field of Classification Search
CPC ........ G05D 1/0212; G01C 9/02; G01S 19/13; G01S 19/43; G01S 19/41; A01D 46/04; A01D 46/30; A01G 25/09; A01M 7/00
See application file for complete search history.

(56) References Cited

U.S. PATENT DOCUMENTS 5,974,348 A * 10/1999 Rocks ................... A01D 46/30
701/28
2016/0252909 A1* 9/2016 Webber ................ A01B 79/005
701/41
(Continued)

FOREIGN PATENT DOCUMENTS

EP          3210467 A1     8/2017
JP          H09-128043 A   5/1997
(Continued)

OTHER PUBLICATIONS

"The Evolution of GPS to GNSS: What Expanding Global Coverage Means for Modern Devices", TAOGLAS (Year: 2024).*
(Continued)

*Primary Examiner* — Jelani A Smith
*Assistant Examiner* — Hana Lee
(74) *Attorney, Agent, or Firm* — Chris Mizumoto

(57)              ABSTRACT

This automated driving system for a work vehicle is provided with: an inertia measuring device that obtains tilt information of a work vehicle; and an automated driving control unit that causes the work vehicle to automatically travel along a target path. The work vehicle is provided with a work device that carries out a predetermined work with respect to a part to be worked on that is positioned away from the ground. The automated driving control unit calculates an offset amount on the basis of height information of a work center of the work device and the tilt information,
(Continued)

and controls the location of the work vehicle with respect to the target path on the basis of the offset amount.

4 Claims, 17 Drawing Sheets

(51) Int. Cl.

| | |
|---|---|
| *A01D 46/30* | (2006.01) |
| *A01G 25/09* | (2006.01) |
| *A01M 7/00* | (2006.01) |
| *G01C 9/02* | (2006.01) |
| *G01S 19/13* | (2010.01) |
| *G01S 19/43* | (2010.01) |
| *G01S 19/47* | (2010.01) |

(52) U.S. Cl.
CPC .............. *G01S 19/47* (2013.01); *A01D 46/04* (2013.01); *A01D 46/30* (2013.01); *A01G 25/09* (2013.01); *A01M 7/00* (2013.01)

(56) References Cited

U.S. PATENT DOCUMENTS

| | | | | |
|---|---|---|---|---|
| 2017/0269597 | A1* | 9/2017 | Maekawa | ............ G05D 1/0289 |
| 2018/0215393 | A1* | 8/2018 | Miyakubo | ............. B60W 50/14 |
| 2020/0029488 | A1* | 1/2020 | Bertucci | ................ G06V 20/56 |
| 2020/0375095 | A1* | 12/2020 | Koto | ........................ G01S 19/14 |
| 2021/0161060 | A1* | 6/2021 | Kaufmann | ........... G05D 1/0088 |

FOREIGN PATENT DOCUMENTS

| | | | |
|---|---|---|---|
| JP | 2002084830 A | * | 3/2002 |
| JP | 2012231744 A | | 11/2012 |
| WO | 2018202633 A1 | | 11/2018 |

OTHER PUBLICATIONS

"What is an IMU? Explanation of meaning and definition, what is measured and how it works", EPSON.*

* cited by examiner

FIG. 2

1 COORDINATE CONVERSION PROCESS

2 TILT CALCULATION PROCESS

3 TILT OFFSET AMOUNT CALCULATION PROCESS

4 DIRECTION CALCULATION PROCESS

AUTOMATED DRIVING SYSTEM FOR WORK VEHICLE

CROSS-REFERENCE

This application is a US National Stage Application under 35 U.S.C. § 371 of International Application No. PCT/JP2020/023848 filed Jun. 17, 2020, which claims foreign priority of JP2019-114955 filed Jun. 20, 2019, the disclosures of which are hereby incorporated by reference in their entirety.

TECHNICAL FIELD

The present invention relates to an automated driving system for a work vehicle, which enables automated driving of a work vehicle that performs a predetermined work on fruit trees, tea trees, etc.

BACKGROUND ART

There is an autonomous driving path generation system in which an autonomous driving path including a path through which the reference point of a vehicle body part passes and a path through which the reference point of the work device that is offset relative to the vehicle body part in the left-right direction of the vehicle body passes is generated for the work vehicle equipped with the work device (ground work device such as a mowing device) that can be offset relative to the vehicle body part in the left-right direction of the vehicle body, so that, during automated driving of the work vehicle, the ground work with the work device that is offset relative to the vehicle body part in the left-right direction of the vehicle body can be performed properly (for example, see Patent Literature 1).

CITATION LIST

Patent Literature

Patent Literature 1: Japanese Unexamined Patent Application Publication No. 2017-211733

DISCLOSURE OF INVENTION

Problems to be Solved by the Invention

For the invention described in the above Patent Literature 1, the planar (two-dimensional) offset of the work device relative to the vehicle body part is considered. That is, as for the work vehicle equipped with the work device that performs a work at a position that is high from the ground such as spraying a chemical on fruit trees in the invention described in Patent Literature 1, making the work device properly perform the work on the work target part at the position that is high from the ground while working during automated driving at an inclined site in particular is not considered. Therefore, it is desired to develop an automated driving system for a work vehicle to enable a predetermined work on a work target part at a position that is high from the ground to be properly performed during automated driving of the work vehicle.

In view of this situation, the main subject of the present invention is to provide an automated driving system for a work vehicle in which a predetermined work on a work target part at a position that is high from the ground can be properly performed during automated driving of the work vehicle.

Means for Solving the Problems

An automated driving system for a work vehicle according to the present invention is equipped with an inertial measuring device, which obtains inclination information of the work vehicle, and an automated driving control part, which makes the work vehicle perform automated driving according to a target path, wherein the work vehicle is equipped with a work device that performs a predetermined work on a work target part that is located away from a ground, and the automated driving control part calculates an offset amount based on altitude information of a work center of the work device as well as the inclination information, in order to control a position of the work vehicle relative to the target path, based on the offset amount.

According to the present invention, it is possible to provide an automated driving system for a work vehicle in which a predetermined work on a work target part at a position that is high from the ground can be properly performed during automated driving of the work vehicle.

BRIEF DESCRIPTION OF DRAWINGS

FIG. 2 is a block diagram illustrating the schematic configuration of the automated driving system for the work vehicle.

DESCRIPTION OF EMBODIMENTS

Hereinafter, as an example of a form for carrying out the present invention, an explanation based on the drawings will be given of an embodiment in which an automated driving system for a work vehicle according to the present invention is applied to a work vehicle for an orchard, whose work target parts are fruits, branches, leaves, etc., that are located at positions relatively high from the ground in fruit trees, such as grapes, apples, etc., that are planted so as to be aligned in multiple rows in an orchard such as a grape orchard or an apple orchard.

Note that the automated driving system for a work vehicle according to the present invention can be applied to a work vehicle for a tea plantation, whose work target parts are branches, leaves, etc., that are located in positions relatively high from the ground in tea trees that are planted so as to be aligned in multiple rows in a tea plantation, for example, other than an orchard, as well as to a work vehicle for a vegetable garden, whose work target parts are fruits, etc., that are located in positions relatively high from the ground in crops such as corns that are planted so as to be aligned in multiple rows in a vegetable garden, etc.

Figure 1:
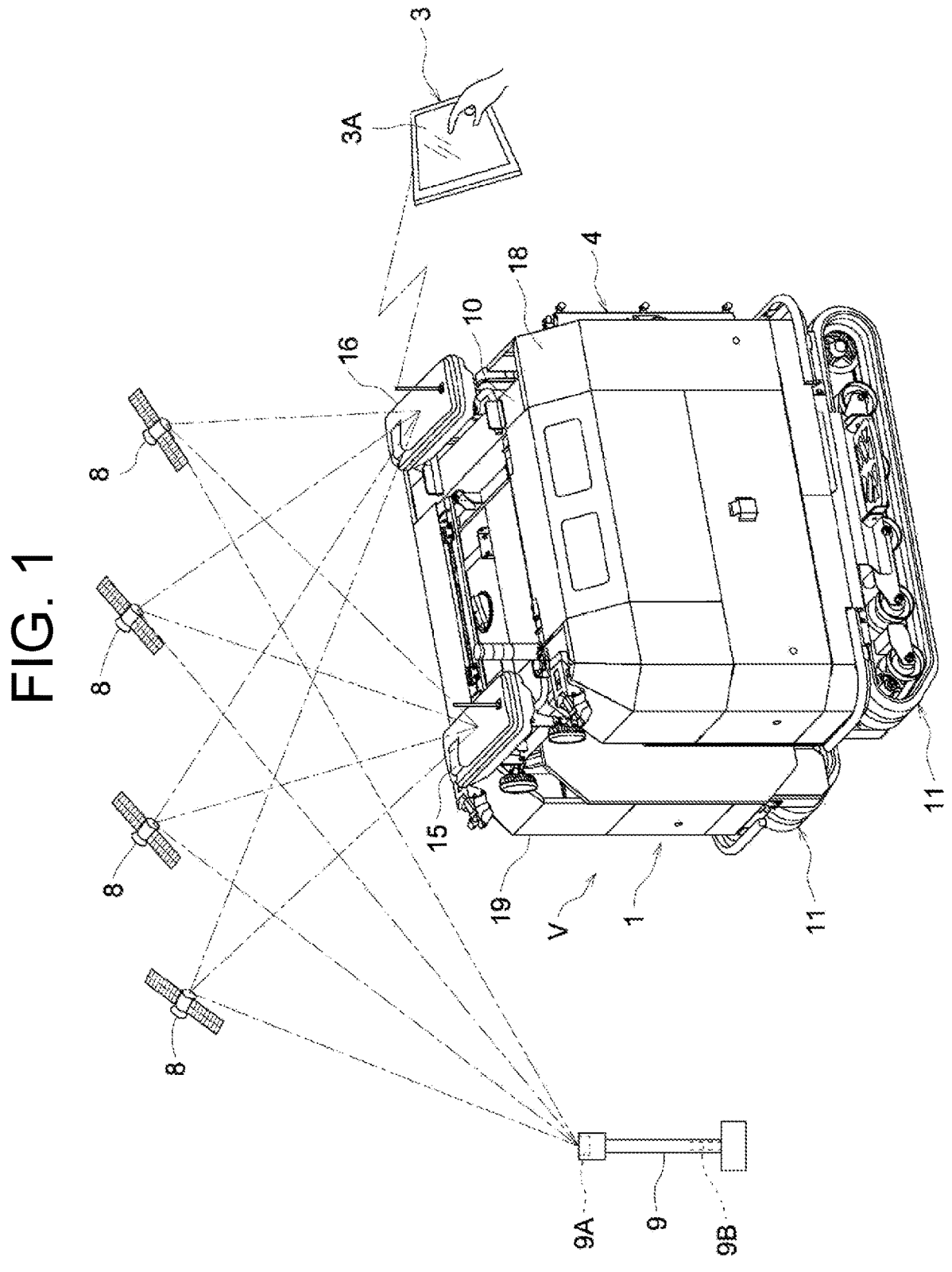
FIG. 1 is a diagram illustrating a schematic configuration of an automated driving system for a work vehicle.
Figure 2:
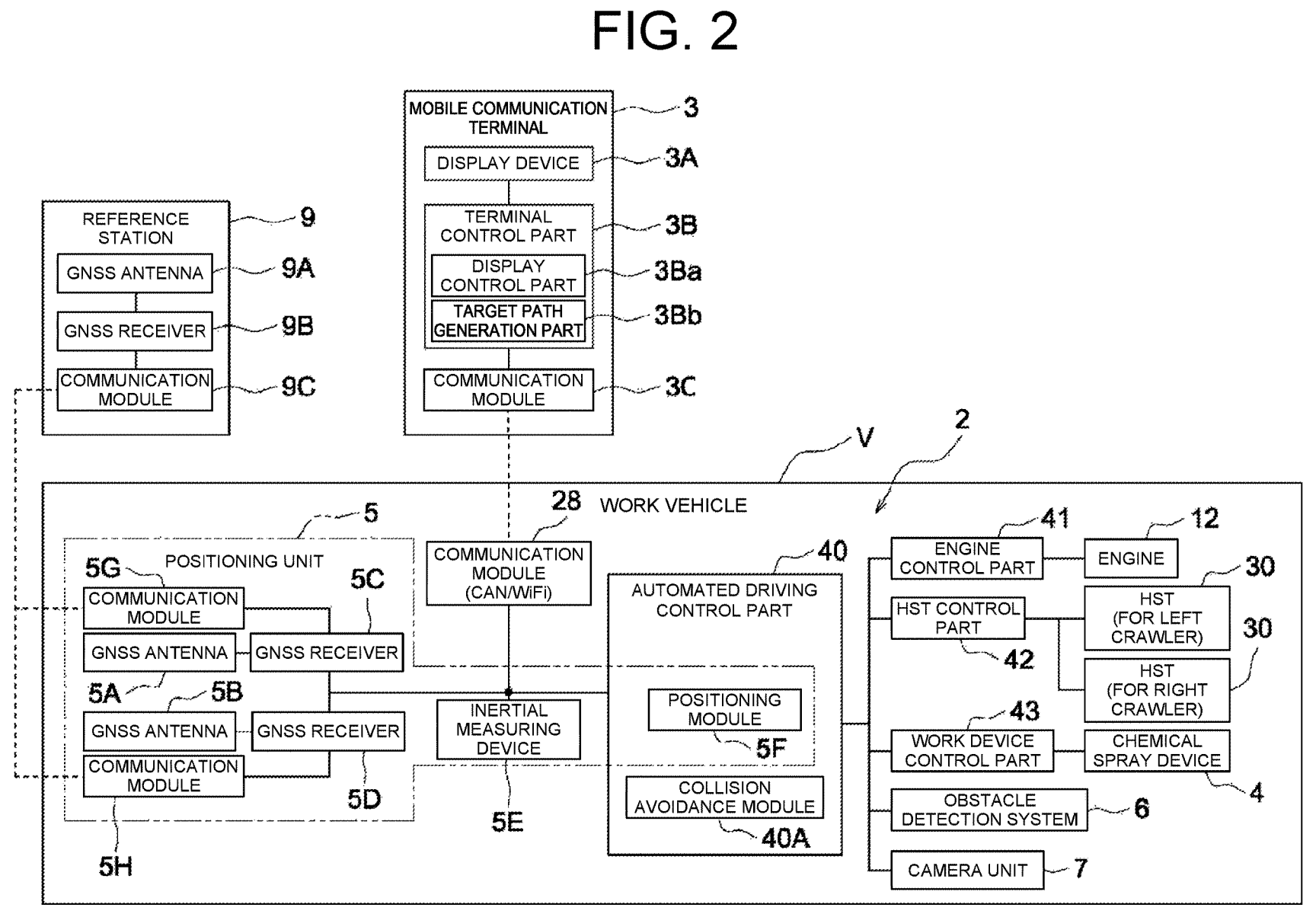

As illustrated in FIG. 1 to FIG. 2, it is possible for the work vehicle V for an orchard which is exemplified in the present embodiment to perform automated driving in an orchard, which is an example of a work site, by using an automated driving system for a work vehicle. The automated driving system for a work vehicle includes the automated driving unit 2 which is mounted on the vehicle body 1 of the work vehicle V, the mobile communication terminal 3 which is an example of a wireless communication device that is set to be capable of performing a wireless communication with the automated driving unit 2, etc. The mobile communication terminal 3 includes the multi-touch-type display device (for example, a liquid crystal panel) 3A, which enables displaying of various kinds of information related to automated driving, input operations, etc.

As illustrated in FIG. 1 to FIG. 8, the work vehicle V is equipped with the vehicle body 1 which has a gate shape so as to straddle fruit trees such as grapes or apples that are planted side by side in multiple rows in an orchard when driving, the spray device 4 (an example of a work device) which sprays a liquid, such as a chemical or water, on fruits, branches, leaves, etc., that are the work target parts, the positioning unit 5 which measures the current position, the current direction, etc., of the vehicle body 1 by utilizing GNSS (Global Navigation Satellite System), which is an example of a satellite positioning system, the obstacle detection system 6 which monitors the surroundings of the vehicle body 1 and detects an obstacle that exists around the vehicle body 1, the camera unit 7 which captures images of the front side and the rear side of the vehicle body 1, etc. The obstacle detection system 6 detects fruit trees or the like planted in an orchard as obstacles.

Note that, instead of or in addition to the spray device 4, it is possible that this work vehicle V is equipped with a work device such as a clipper-type plucking device (not illustrated in the drawings) that plucks branches and leaves which are the work target parts, a cultivator (not illustrated in the drawings) that performs weeding and crushing soil, etc., between fruit trees, and the like. The mobile communication terminal 3 can employ an HMI tablet, a smartphone, etc. For the wireless communication, a wireless LAN (Local Area Network) such as Wi-Fi®, a short-range wireless communication such as Bluetooth®, etc., can be employed.

As illustrated in FIG. 1 and FIG. 3 to FIG. 8, the vehicle body 1 has the vehicle body frame 10 which is formed in a gate shape in the front-rear direction view, and the left and right crawlers 11 which are connected to the left and right lower end parts of the vehicle body frame 10. On the left side section of the vehicle body 1, the engine 12, the battery 13, etc., are mounted. The right side section of the vehicle body 1 is equipped with the oil tank 14, which is made of a steel plate formed in a lateral L-shape, the storage tank 4A of the spray device 4, etc. The ceiling part of the vehicle body 1 is equipped with the front antenna unit 15 which is arranged on the front side of the ceiling part, the rear antenna unit 16 which is arranged on the rear side of the ceiling part, the stacked indicator light 17 which indicates the driving status of the vehicle body 1, etc. The engine 12, the battery 13, etc., are covered with the left cover member 18 formed as an outer surface on the left side of the vehicle body 1. The oil tank 14, the storage tank 4A, etc., are covered with the right cover member 19 formed as an outer surface on the right side of the vehicle body 1.

As illustrated in FIG. 3 to FIG. 8, the vehicle body frame 10 has the left and right side frames 20 which are arranged in parallel with a predetermined distance in the left-right direction, the front cross member 21 which bridges the upper end parts on the front end side of the left and right side frames 20, the rear cross member 22 which bridges the upper end parts on the rear end side of the left and right side frames 20, etc. Accordingly, the vehicle body frame 10 is formed in a gate shape securely having a space for allowing fruit trees to pass through between the left and right side frames 20. To the left and right side frames 20, the inner wall members 23 formed as the left and right inner surfaces of the vehicle body 1 are attached, respectively.

As illustrated in FIG. 4 to FIG. 7, each of the side frames 20 has the base member 20A which extends in the front-rear direction of the vehicle body 1, the front columnar support member 20B which extends upward from the front end part of the base member 20A, the rear columnar support member 20C which extends upward from the rear end part of the base member 20A, the upper-side member 20D which bridges the upper end part of the front columnar support member 20B and the upper end part of the rear columnar support member 20C, etc. Accordingly, the left and right side frames 20 are formed in a rectangular shape in the left-right direction view.

Figure 4:
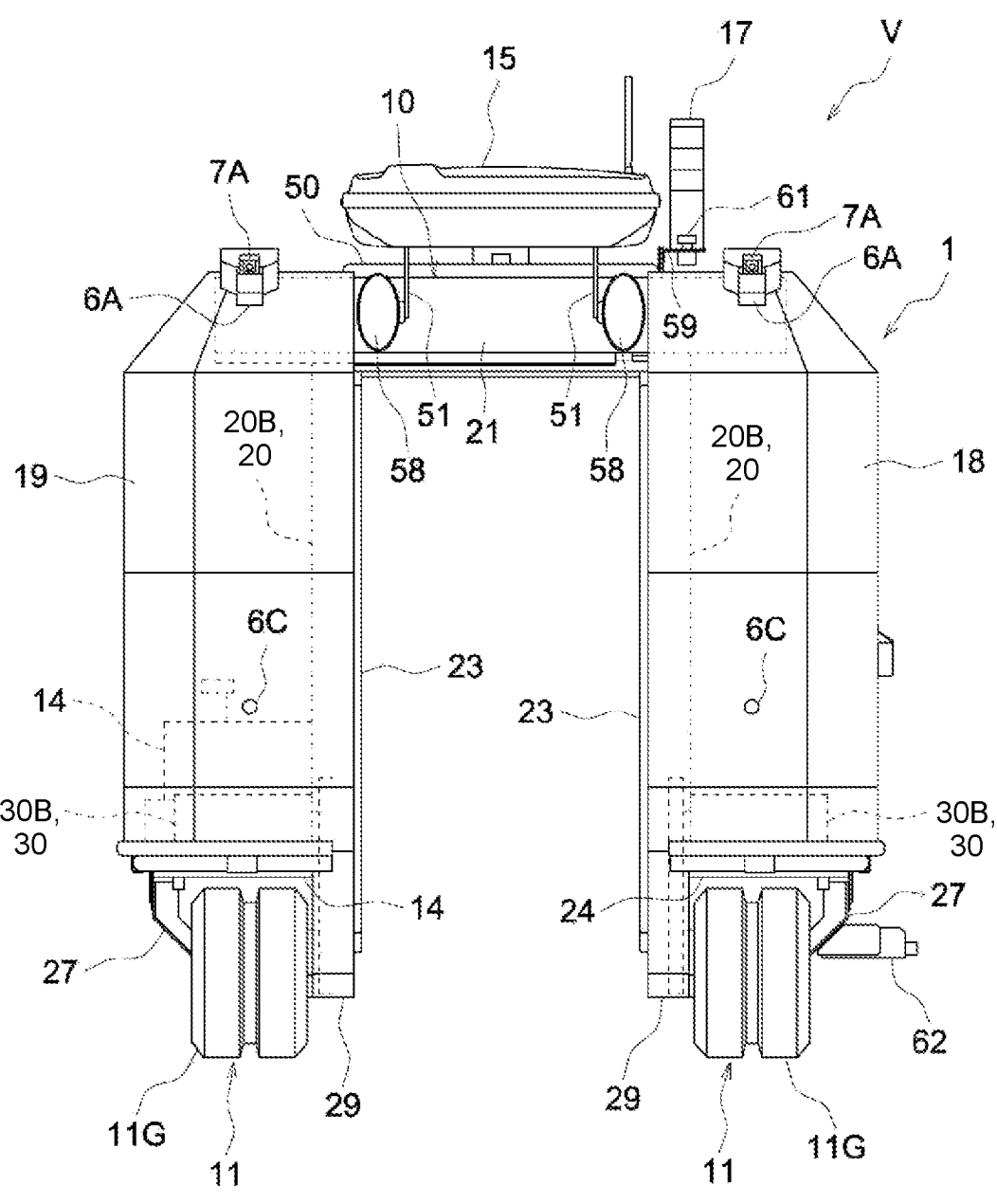
FIG. 4 is a front view illustrating the configuration of the work vehicle for an orchard.
Figure 5:
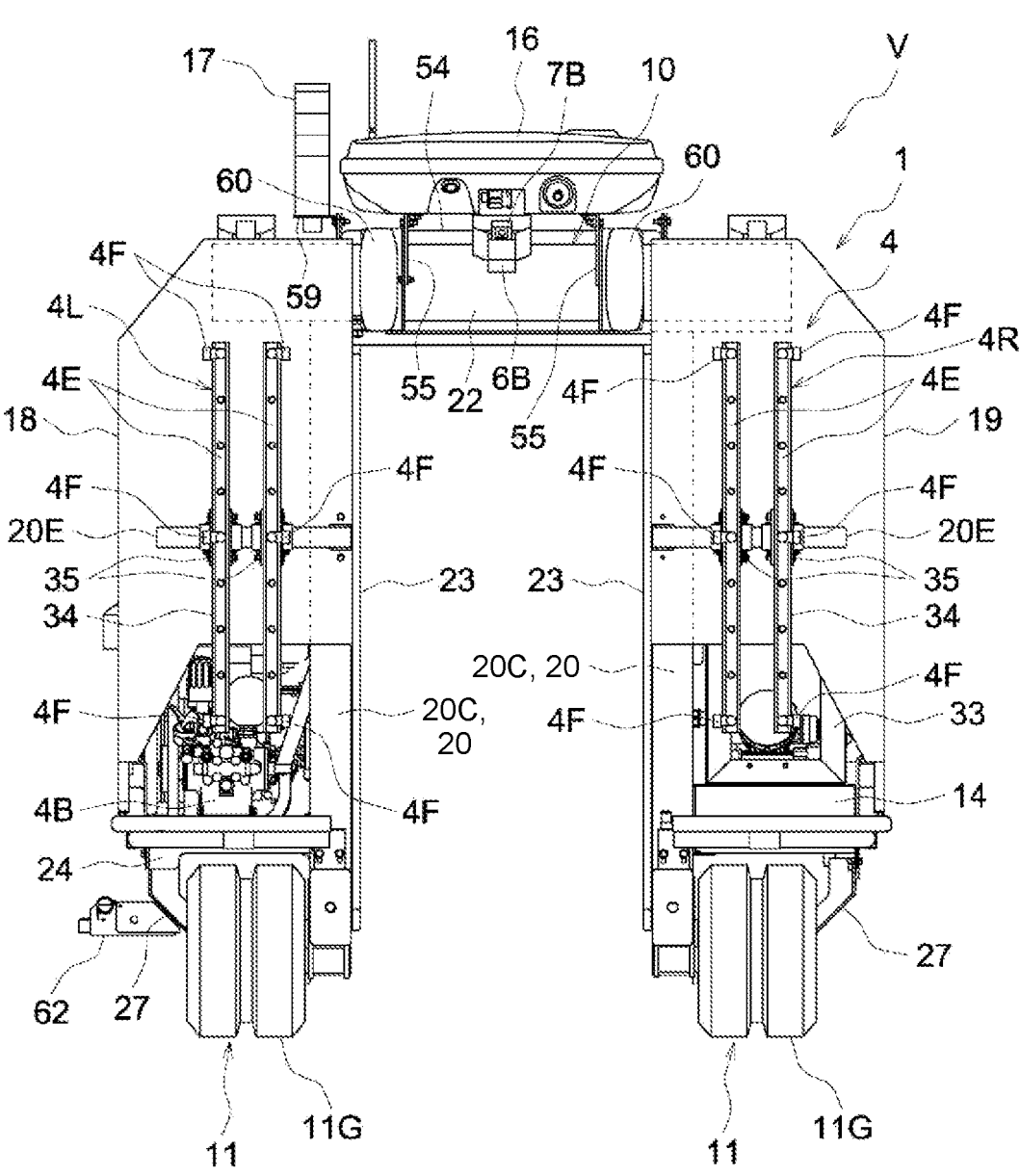
FIG. 5 is a rear view illustrating the configuration of the work vehicle for an orchard.
Figure 6:
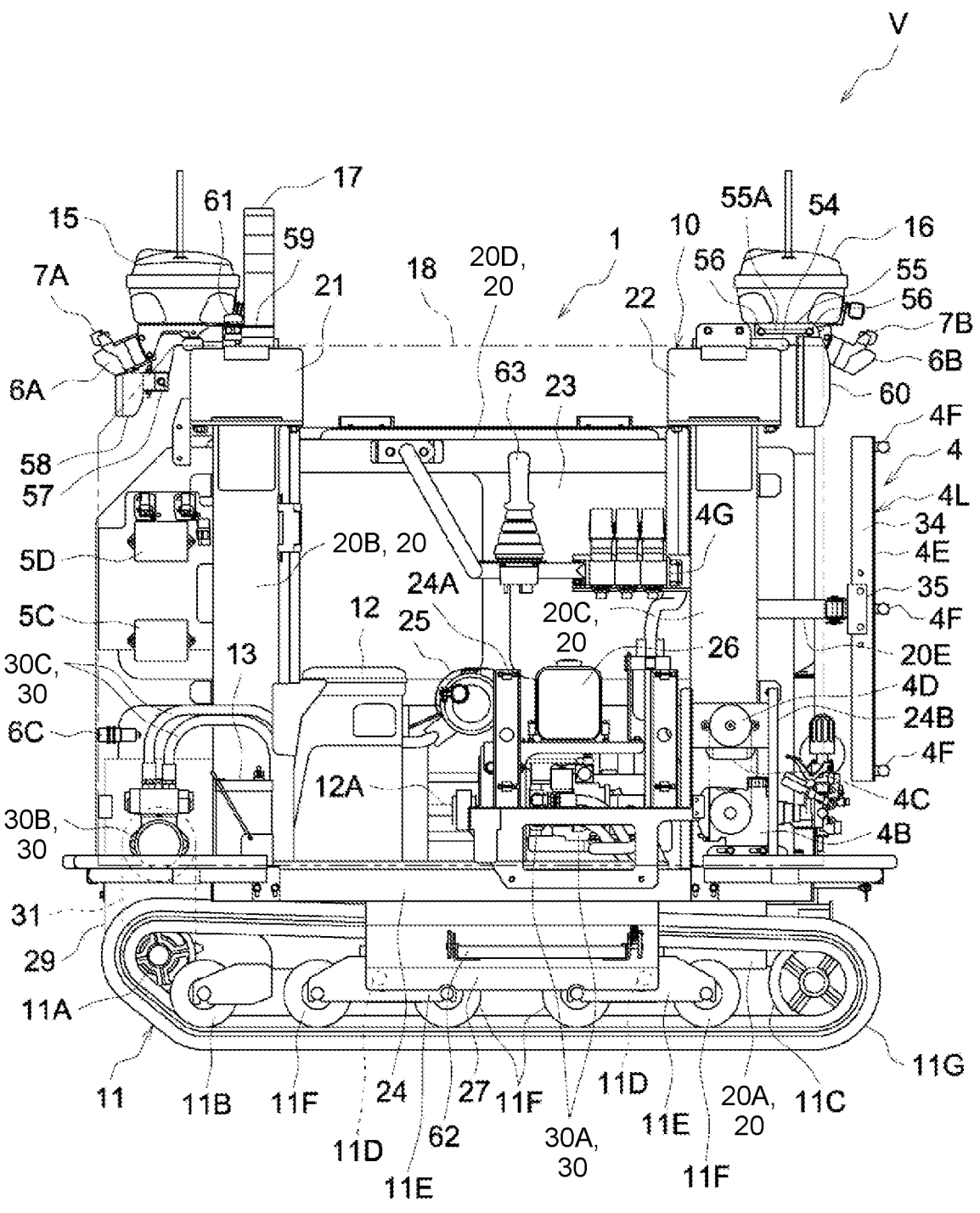
FIG. 6 is a right side view illustrating the configuration of the work vehicle for an orchard in a state where a left cover member is removed.

As illustrated in FIG. 3 to FIG. 6, of the left and right side frames 20, the left side frame 20 supports the mounting platform 24 on which the engine 12, the battery 13, etc., are mounted. The mounting platform 24 protrudes leftward from the lower part of the left side frame 20 so as to be arranged right above and in close proximity to the left crawler 11. As illustrated in FIG. 6, the mounting platform 24 is equipped with the first support part 24A that supports the muffler 25 and the fuel tank 26.

Figure 7:
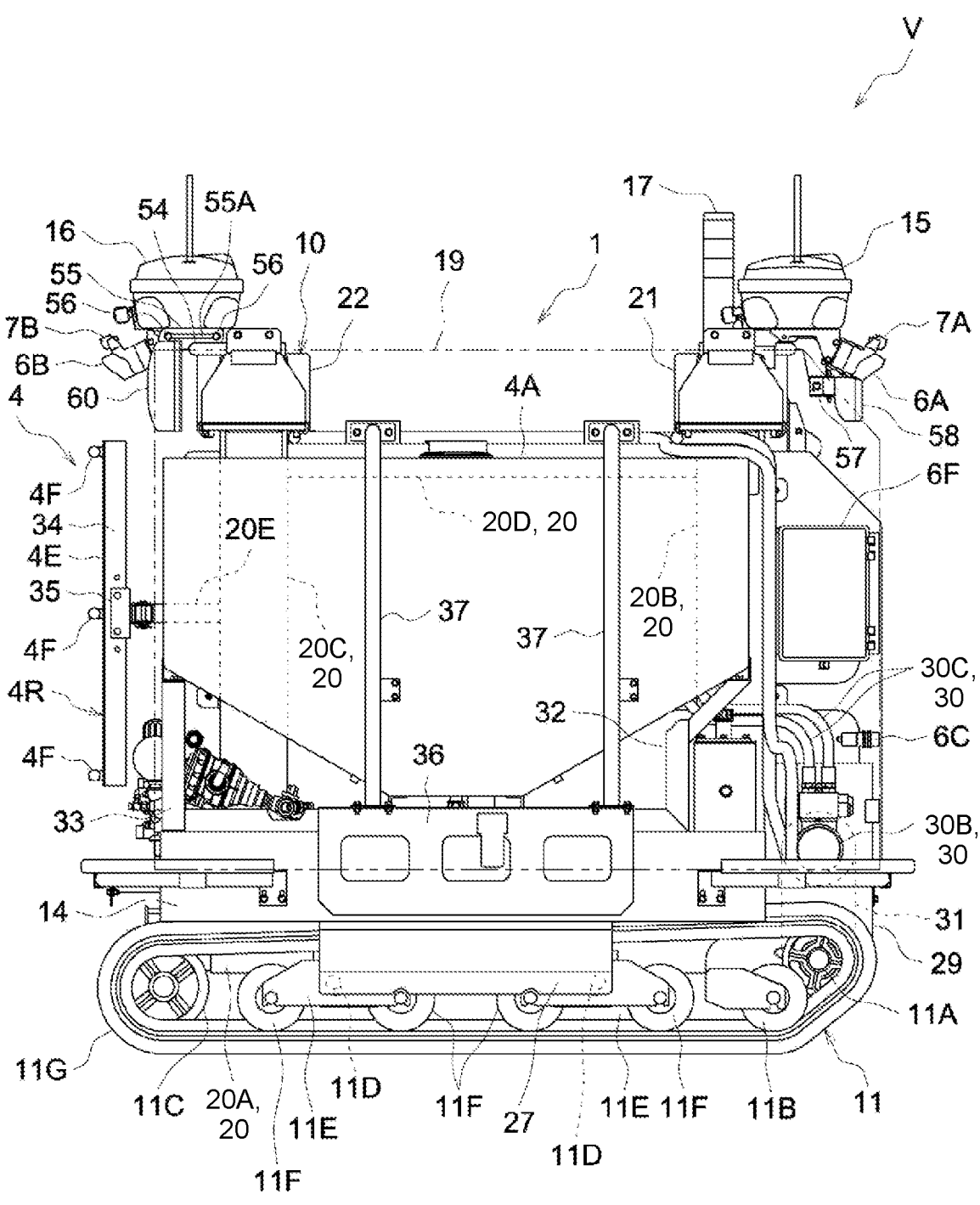
FIG. 7 is a left side view illustrating the configuration of the work vehicle for an orchard in a state where a right cover member is removed.

As illustrated in FIG. 4 to FIG. 5 and FIG. 7, the oil tank 14 which is in a state of extending rightward from the lower part of the right side frame 20 is connected to the right side frame 20. Accordingly, the oil tank 14 is arranged right above and in close proximity to the right crawler 11.

That is, in this work vehicle V, the engine 12 and the battery 13, which are heavy, and the oil tank 14, which is heavy when storing oil, etc., are respectively arranged on the left and right sides in the lower part of the vehicle body 1. Accordingly, this work vehicle V is designed to have a low center of gravity in a left-right balanced state. As a result, it is possible for the work vehicle V to stably perform contour driving, etc. on a slope in an orchard.

Figure 3:
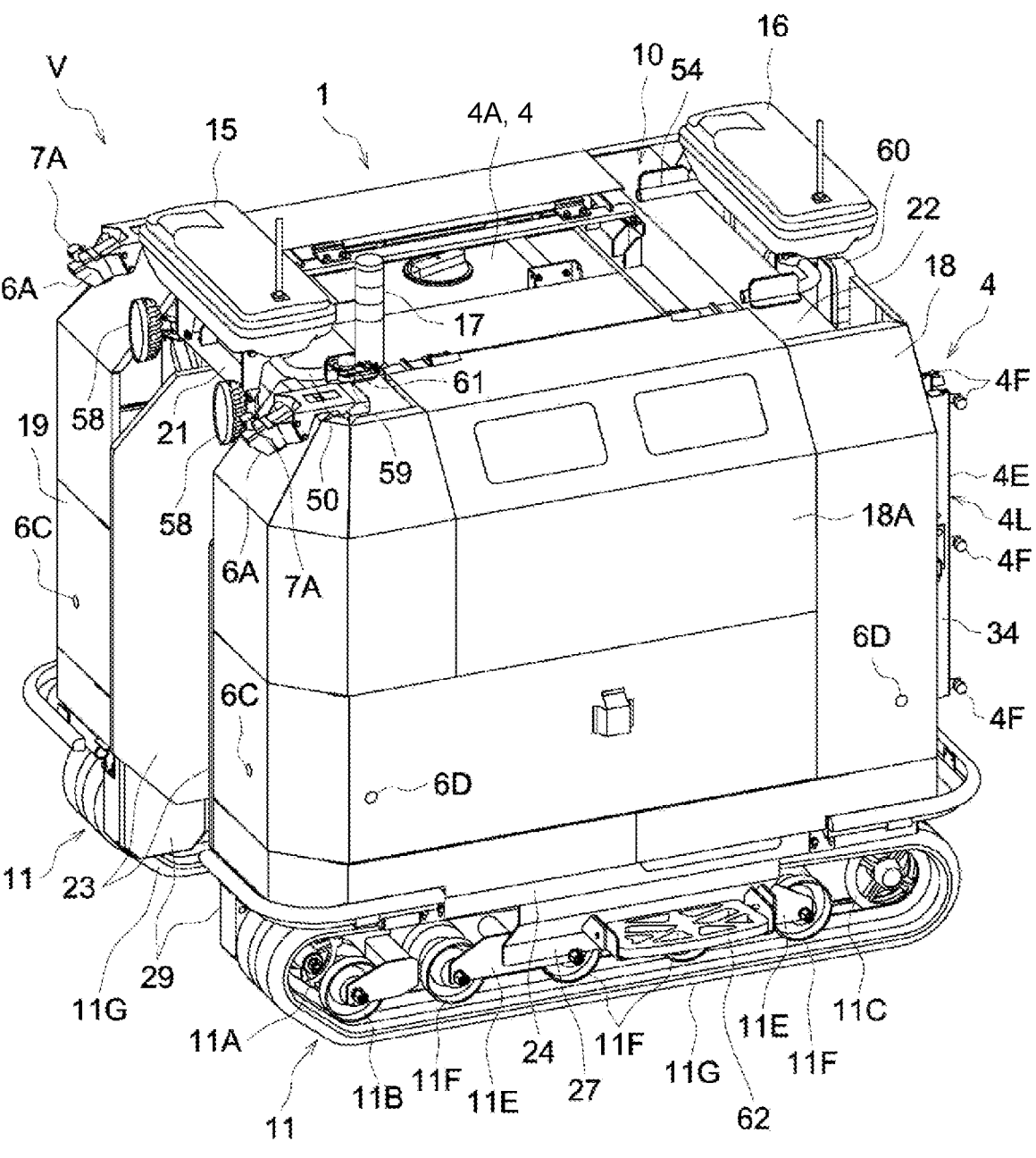
FIG. 3 is a perspective view illustrating a configuration of the work vehicle for an orchard.

As illustrated in FIG. 3 and FIG. 6 to FIG. 7, the base members 20A of the side frames 20 are also used as the track frames of the left and right crawlers 11. In each of the left and right crawlers 11, the drive sprocket 11A and the first road wheel 11B are supported in a rotatable manner at the front end part of the track frame (base member) 20A. In the rear end part of the track frame 20A, the idler wheel 11C for tensioning is supported so as to be displaceable in the front-rear direction. The middle part of the track frame 20A with respect to the front-rear direction is equipped with the front and rear equalizer arms 11E which pivotally swing in the up-down direction with the front and rear support shafts 11D extending in the laterally outward direction from the track frame 20A. The second road wheels 11F are supported in a rotatable manner at the front and rear idler end parts in each of the equalizer arms 11E. That is, the four second road wheels 11F are supported at the middle part of the track frame 20A with respect to the front-rear direction so as to be swingable/displaceable in the up-down direction. The crawler belt 11G is wrapped around the drive sprocket 11A, each of the road wheels 11B and 11F, and the idler wheel 11C. The rear part of the track frame 20A is equipped with a tensioning mechanism (not illustrated in the drawings) that biases the idler wheel 11C to displace rearward so as to maintain the crawler belt 11G in a tensioned state.

As illustrated in FIG. 3 to FIG. 6, in the left crawler 11, the left end parts of the front and rear support shafts 11D are connected to the left end part of the mounting platform 24 via the left support plate 27. As illustrated in FIG. 4 to FIG. 5 and FIG. 7, in the right crawler 11, the right end parts of the front and rear support shafts 11D are connected to the right end part of the oil tank 14 via the right support plate 27. That is, in this work vehicle V, the vehicle body frame 10 and the left and right crawlers 11 are configured as an integrated structure.

As illustrated in FIG. 4 and FIG. 6 to FIG. 7, the power from the engine 12 is transmitted to the drive sprockets 11A of the respective crawlers 11 via the pair of hydro-static continuously-variable transmissions (hereinafter referred to as HSTs) 30 and the left and right chain-type power-transmission device 31. Each HST 30 employs a separate-type HST having the hydraulic pump 30A of a variable displacement and axial plunger type, the hydraulic motor 30B of a fixed displacement and axial plunger type, the multiple hydraulic pipes 30C connecting the hydraulic pump 30A and the hydraulic motor 30B, etc.

With the above-described configuration, the left and right crawlers 11 are driven by the power from the engine 12 in a state where independent gear change can be performed with the corresponding HSTs 30. Accordingly, this vehicle body 1 is turned into the forward-traveling state when the left and right crawlers 11 are driven at an even speed in the forward-traveling direction so that the vehicle body 1 travels straight in the forward-traveling direction and is turned into the rearward-traveling state when the left and right crawlers 11 are driven at an even speed in the rearward-traveling direction so that the vehicle body 1 travels straight in the rearward-traveling direction. The vehicle body 1 is turned into the forward-traveling turning state when the left and right crawlers 11 are driven at uneven speeds in the forward-traveling direction so that the vehicle body 1 makes a gentle turn while traveling forward and is turned into the rearward-traveling turning state when the left and right crawlers 11 are driven at uneven speeds in the rearward-traveling direction so that the vehicle body 1 makes a gentle turn while traveling rearward. The vehicle body 1 is turned into the pivot turning state when driving of either one of the left and right crawlers 11 is stopped while the other crawler 11 is driven and is turned into the spin turning state when the left and right crawlers 11 are driven at an even speed in the forward-traveling direction and the backward-traveling direction. The vehicle body 1 is turned into the driving-stopped state when the driving of the left and right crawlers 11 is stopped.

Note that it is also possible that the left and right crawlers 11 are configured as an electric type in which the drive sprockets 11A thereof are driven by left and right electric motors.

As illustrated in FIG. 6, the hydraulic pump 30A of each HST 30 is of a double type, which is driven by a single pump shaft (not illustrated in the drawings) directly connected to the output shaft 12A of the engine 12. The double hydraulic pump 30A is mounted on the mounting platform 24 so as to be located right below the fuel tank 26. As illustrated in FIG. 3 to FIG. 4 and FIG. 6 to FIG. 7, the left and right hydraulic motors 30B are attached to the upper part of the power-transmission case 29, which is connected to a lower part of the front end of each side frame 20. Each of the hydraulic pipes 30C is installed along the vehicle body frame 10. Inside the corresponding power-transmission cases 29, the left and right chain-type power-transmission devices 31 transmit power from output shafts (not illustrated in the drawings) of the hydraulic motors 30B to drive shafts (not illustrated in the drawings) which integrally rotate together with the drive sprockets 11A of the crawlers 11.

As illustrated in FIG. 3 and FIG. 5 to FIG. 8, the spray device 4 has the storage tank 4A that stores a chemical or the like, the spray pump 4B that transfers a chemical or the like with a pressure, the electric spray motor 4C that drives the spray pump 4B, the belt-type power-transmission device 4D that transmits power from the spray motor 4C to the spray pump 4B, the spray pipes 4E of which two pipes are arranged in parallel in a vertical posture on each of the left and right sides at the rear part of the vehicle body 1, the total of twelve spray nozzles 4F of which three nozzles are arranged on each spray pipe 4E, the electronically-controlled valve unit 4G which changes the spraying amount and spraying pattern of a chemical or the like, multiple pipes for spraying (not illustrated in the drawings) that connect the above-mentioned components, etc.

The storage tank 4A is supported by the oil tank 14 via the front and rear support frames 32 and 33, which are arranged on the upper surface of the oil tank 14. The spray pump 4B is mounted at the rear part of the mounting platform 24. The spray motor 4C is supported by the second support part 24B, which is arranged at the rear part of the mounting platform 24. The spray motor 4C is arranged right above the spray pump 4B. The two spray pipes 4E on the left side are respectively attached to the support member 20E, which is in an L-shape in plan view and is arranged on the left side frame 20, via the pipe holder 34 that extends in the up-down direction and the bracket 35 that is connected to the middle part of the pipe holder 34 with respect to the up-down direction. The two spray pipes 4E on the right side are respectively attached to the support member 20E, which is in an L-shape in plan view and is arranged on the right side frame 20, via the pipe holder 34 that extends in the up-down direction and the bracket 35 that is connected to the middle part of the pipe holder 34 with respect to the up-down direction.

Each spray nozzle 4F is attached to the corresponding spray pipe 4E so as to be repositionable in the up-down direction. Accordingly, the respective spray nozzles 4F can change their vertical spacing and their height positions relative to the spray pipes 4E according to the spraying targets. Each pipe holder 34 is connected via a pin to the corresponding bracket 35 so as to be repositionable in the up-down direction. Accordingly, the respective spray nozzles 4F can change their height positions relative to the vehicle body 1 for each pipe holder 34 according to the spraying targets. Each bracket 35 is connected via a pin to the corresponding support member 20E so as to be repositionable in the left-right direction. Accordingly, the respective spray nozzles 4F can change their left-right positions relative to the vehicle body 1 for each bracket 35 according to the spraying targets.

Note that, in the spray device 4, the number of spray nozzles 4F arranged for each spray pipe 4E can be changed in various ways according to the type of fruit trees, the length of each spray pipe 4E, etc.

As illustrated in FIG. 3 and FIG. 5 to FIG. 9, of the respective spray nozzles 4F, the three spray nozzles 4F arranged for the leftmost spray pipe 4E spray a chemical or the like in a leftward direction toward the fruit trees Z located on the left outer side of the vehicle body 1. Of the respective spray nozzles 4F, the three spray nozzles 4F arranged for the middle-left spray pipe 4E, which is adjacent to the leftmost spray pipe 4E, spray a chemical or the like in a rightward direction toward the fruit trees Z located in the central space of the vehicle body 1 with respect to the left-right direction. Of the respective spray nozzles 4F, the three spray nozzles 4F arranged for the rightmost spray pipe 4E spray a chemical or the like in a rightward direction toward the fruit trees Z located on the right outer side of the vehicle body 1. Of the respective spray nozzles 4F, the three spray nozzles 4F arranged for the middle-right spray pipe 4E, which is adjacent to the rightmost spray pipe 4E, spray a chemical or the like in a leftward direction toward the fruit trees Z located in the central space of the vehicle body 1 with respect to the left-right direction.

With the above-described configuration, in this spray device 4, the two spray pipes 4E and the six spray nozzles 4F arranged at the rear part on the left side of the vehicle body 1 function as the left liquid spray part 4L (an example of the work part). Further, the two spray pipes 4E and the six spray nozzles 4F arranged at the rear part on the right side of the vehicle body 1 function as the right liquid spray part (an example of the work part) 4R. Further, the left and right liquid spray parts 4L and 4R are arranged at the rear part of the vehicle body 1 in a state of being able to perform spraying in the left and right directions, so as to have a distance between the left and right liquid spray parts 4L and 4R in the left-right direction for allowing the fruit trees Z to pass through.

In the spray device 4, the spraying patterns of the left and right liquid spray parts 4L and 4R include the four-direction spraying pattern, in which the left and right respective liquid spray parts 4L and 4R spray in both left and right directions, and the direction-limited spraying pattern, in which the spraying directions of the left and right liquid spray parts 4L and 4R are limited. The direction-limited spraying pattern includes the left-side three-direction spraying pattern, in which the left liquid spray part 4L sprays in both left and right directions and the right liquid spray part 4R sprays only in the left direction, the right-side three-direction spraying pattern, in which the left liquid spray part 4L sprays only in the right direction and the right liquid spray part 4R sprays in both left and right directions, and the two-direction spraying pattern, in which the left liquid spray part 4L sprays only in the right direction and the right liquid spray part 4R sprays only in the left direction.

As illustrated in FIG. 7, the left end part of the oil tank 14 is supported by the base member 20A of the right side frame 20. The support plate 36 is connected to the right end part of the oil tank 14. The upper end part of the support plate 36 is connected to the upper-side member 20D of the right side frame 20 via the front and rear support members 37. Accordingly, the right end part of the oil tank 14 is supported by the upper-side member 20D of the right side frame 20 via the support plate 36 and the front and rear support members 37.

That is, since both left and right end parts of the oil tank 14 are respectively supported by the right side frame 20, the oil tank 14 has a support strength which is high enough to be used as a mounting platform on which the storage tank 4A is mounted. Note that the shape of the oil tank 14 in plan view is left-right reversal of the shape of the mounting platform 24 in plan view.

As illustrated in FIG. 2, the vehicle body 1 is equipped with the automated driving control part 40 which makes the vehicle body 1 perform automated driving according to the target path P (see FIG. 9) in an orchard based on positioning information or the like obtained from the positioning unit 5, the engine control part 41 which performs control related to the engine 12, the HST control part 42 which performs control related to each HST 30, the work device control part 43 which performs control related to a work device such as the spray device 4, etc. Each of the control parts 40 to 43 is structured with an electronic control unit on which a microcontroller or the like is mounted, various kinds of information and control programs stored in a non-volatile memory (e.g., an EEPROM such as a flash memory) of the microcontroller, etc. The various kinds of information stored in the non-volatile memory includes the target path P which is generated in advance according to the orchard of the work target, etc.

The respective control parts 40 to 43 are connected in a mutually communicable manner via CAN (Controller Area Network), which is an example of an in-vehicle network. For example, in-vehicle Ethernet, CAN-FD (CAN with Flexible Data rate), or the like may be employed as the in-vehicle network.

Figure 9:
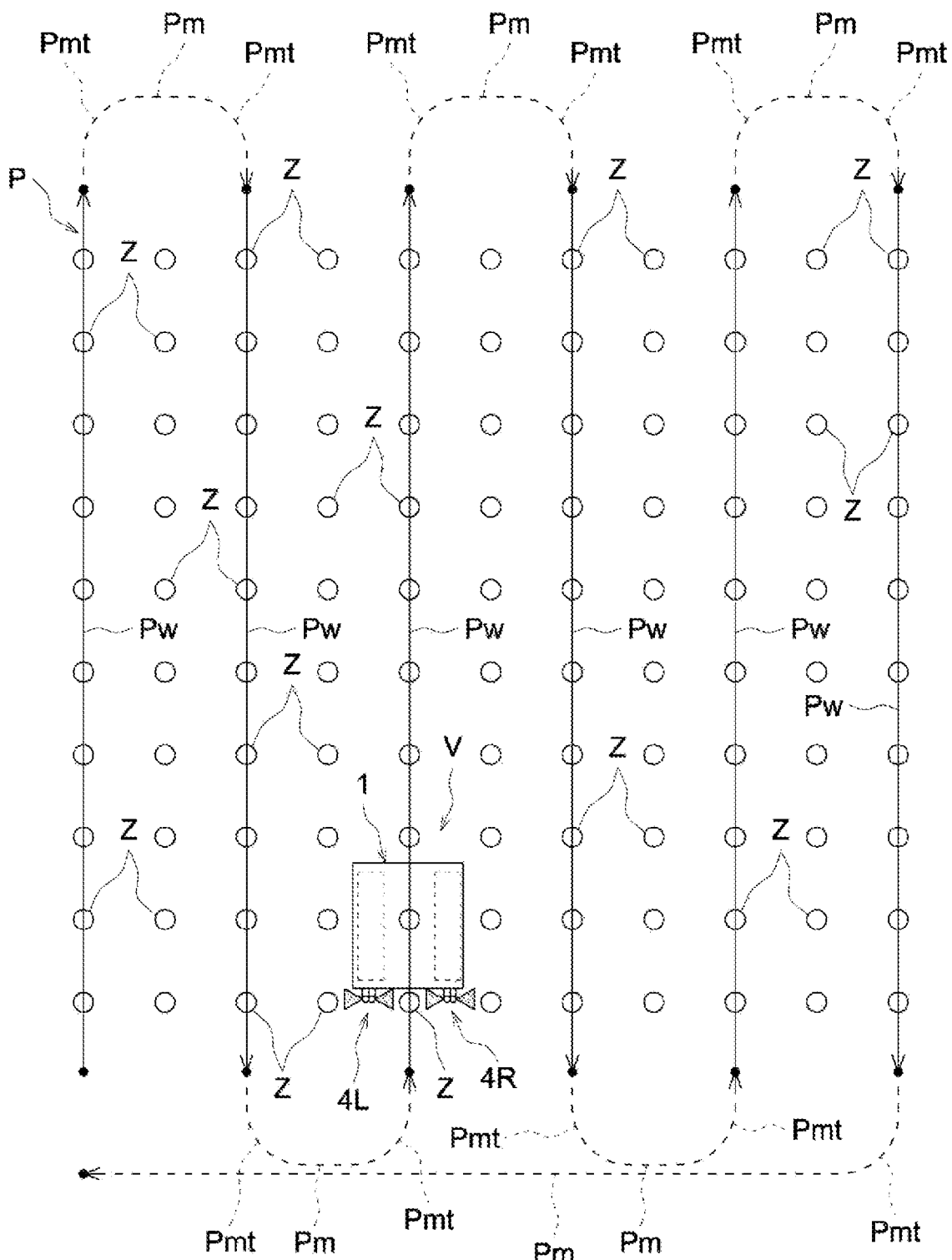
FIG. 9 is a plan view illustrating an example of a target path for an orchard.
Figure 10:
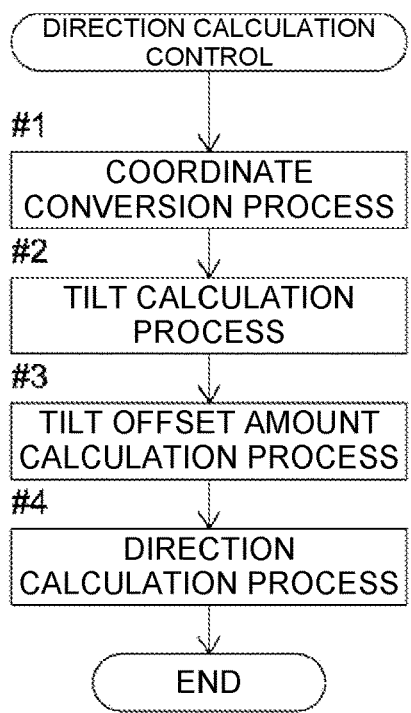
FIG. 10 is a flowchart of direction calculation control.
Figure 11:
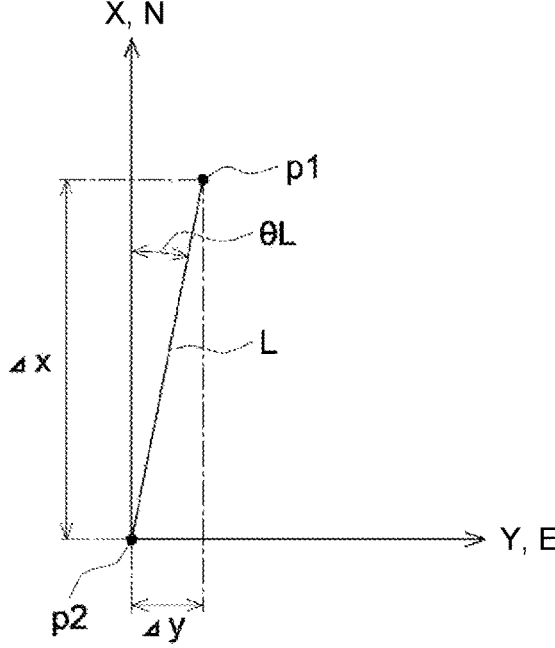
FIG. 11 is an explanatory diagram of a tilt calculation process.
Figure 12:
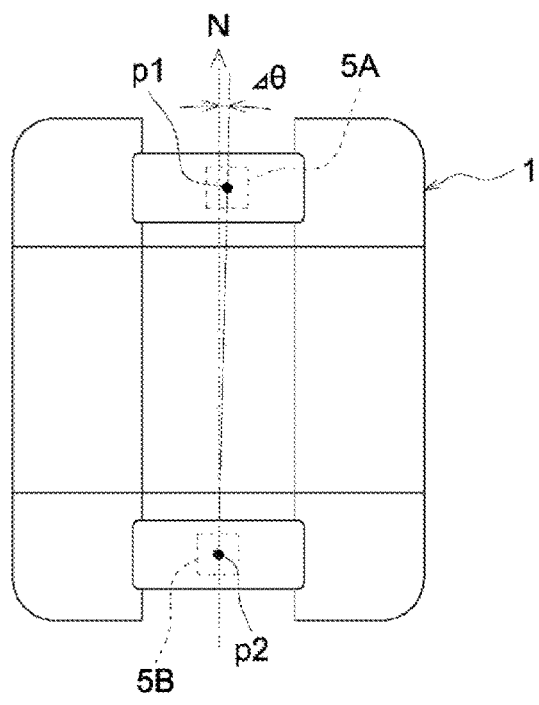
FIG. 12 is an explanatory diagram of a tilt offset amount calculation process.
Figure 13:
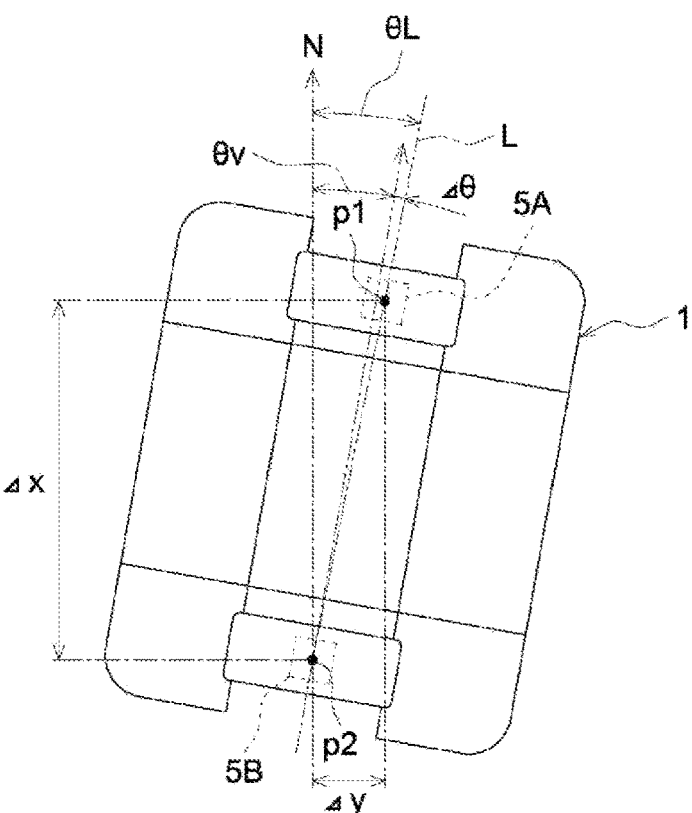
FIG. 13 is an explanatory diagram of a direction calculation process.

As illustrated in FIG. 9, the target path P includes the work paths Pw in multiple rows, on which the work vehicle V drives while performing a work on the fruit trees Z that are planted in multiple rows, and the multiple move paths Pm, which connect work paths Pw in the multiple rows in the driving order of the work vehicle V. Each of the move paths Pm is a path on which the work vehicle V drives without performing a work. Each of the move paths Pm includes a turn path Pmt for changing the direction of the vehicle body 1. The target path P includes various kinds of information related to automated driving, such as the driving direction, set vehicle speed, driving state, working state, etc., of the vehicle body 1 in each of the paths Pw and Pm.

Note that, in each work path Pw, the vehicle speed thereof is set to a relatively high speed (work speed) since the respective work paths Pw are straight paths or approximately straight paths corresponding to the fruit trees Z that are planted side by side in multiple rows. Further, in each turn path Pmt of each move path Pm, the vehicle speed thereof is set to a lower speed (turning speed) than the vehicle speed in the work paths Pw, in order to prevent the work vehicle V from deviating from the turn paths Pmt. On the other hand, since the move paths other than the respective turn paths Pmt are straight paths or approximately straight paths, as with the work paths Pw, the vehicle speed
thereof is set to a relatively high speed as with the respective
work paths Pw.

Note that the target path P illustrated in FIG. 9 is merely
an example, and the target path P can be changed in various
ways according to vehicle information such as the type of
work device included in the vehicle body 1 and the form of
work, work site information such as the arrangement state
and the number of rows of fruit trees Z which vary in each
orchard, etc.

As illustrated in FIG. 2, the mobile communication ter-
minal 3 is equipped with the terminal control part 3B that
performs control related to the display device 3A, etc. The
terminal control part 3B is structured with an electronic
control unit on which a microcontroller or the like is
mounted, various kinds of information and control programs
stored in a non-volatile memory (e.g., an EEPROM such as
a flash memory) of the microcontroller, etc. The terminal
control part 3B includes the display control part 3Ba which
controls the display device 3A in relation to a display or
notification, the target path generation part 3Bb which
generates the target path P (see FIG. 9) for enabling the work
vehicle V to perform automated driving in an orchard in
which the fruit trees Z are arranged side by side in multiple
rows, etc. The display control part 3Ba and the target path
generation part 3Bb are structured with various kinds of
control programs, etc., which are stored in a non-volatile
memory of the terminal control part 3B. The various kinds
of information stored in the non-volatile memory includes
work site information, the target path P (see FIG. 9), etc.
Accordingly, it is possible to display the work site informa-
tion, the target path P, etc., on the display device 3A of the
mobile communication terminal 3.

The vehicle body 1 and the mobile communication ter-
minal 3 are equipped with the communication modules 28
and 3C that enable a wireless communication between the
automated driving control part 40 and the terminal control
part 3B. In a case where Wi-Fi is employed for the wireless
communication with the mobile communication terminal 3,
the communication module 28 of the vehicle body 1 func-
tions as a converter that converts communication informa-
tion bidirectionally for CAN and Wi-Fi. The terminal control
part 3B can obtain various kinds of information related to the
vehicle body 1, which include the current position, current
direction, etc., of the vehicle body 1, via the wireless
communication with the automated driving control part 40.
Accordingly, various kinds of information including the
current position, current direction, etc., of the vehicle body
1 relative to the target path P can be displayed on the display
device 3A of the mobile communication terminal 3.

Figure 8:
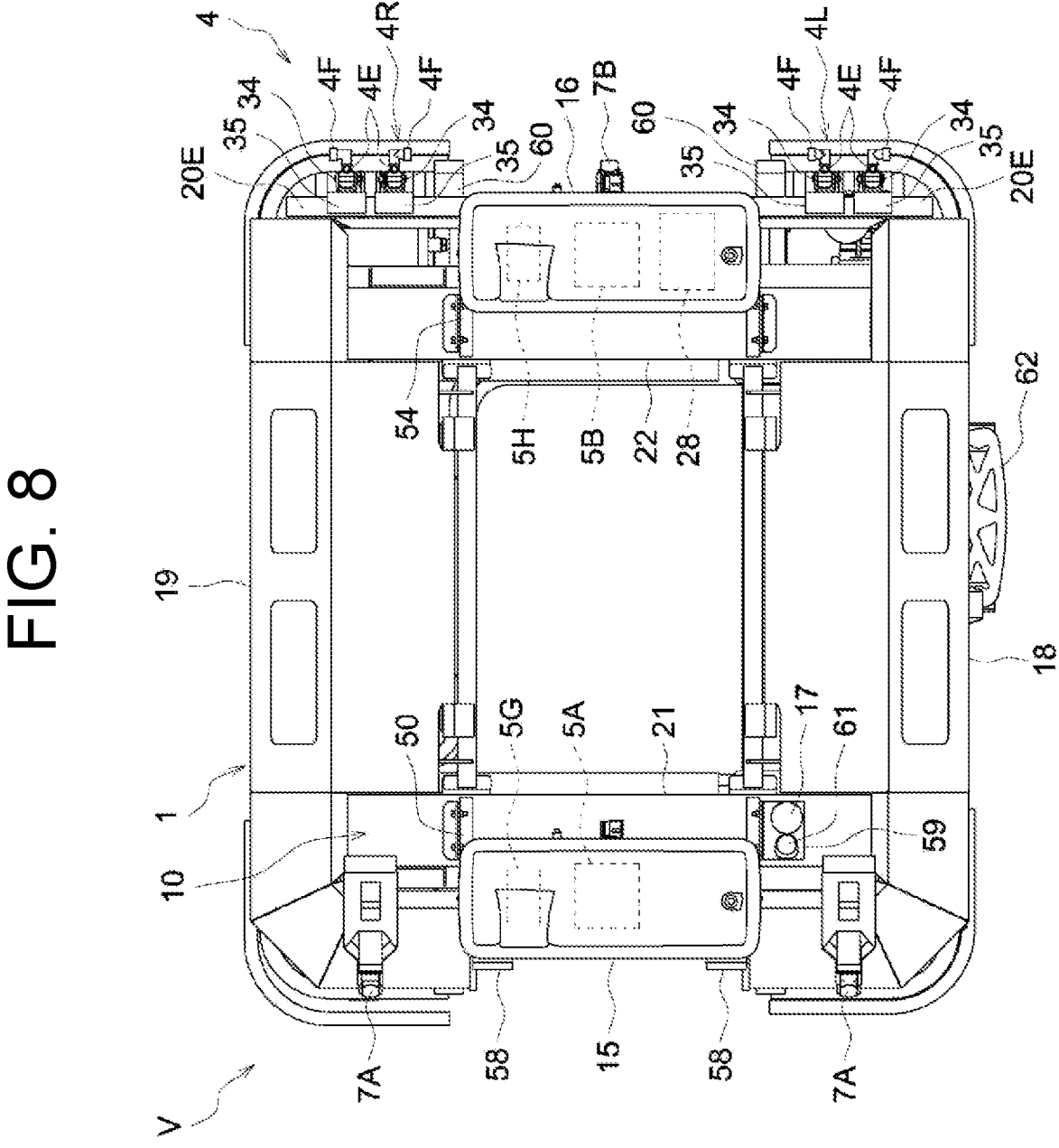
FIG. 8 is a plan view illustrating the configuration of the working vehicle for an orchard.

As illustrated in FIG. 2 and FIG. 8, the positioning unit 5
includes the two GNSS antennas 5A and 5B which receive
radio waves transmitted from multiple positioning satellites
8 (see FIG. 1), the two GNSS receivers 5C and 5D which
utilize the radio waves received by the respective GNSS
antennas 5A and 5B to measure the positions of the respec-
tive GNSS antennas 5A and 5B (hereinafter may be simply
referred to as the antenna positions), the inertial measuring
device (IMU: inertial measurement unit) 5E which measures
the posture, direction, etc., of the vehicle body 1, the
positioning module 5F which calculates the current position,
current direction, etc., of the vehicle body 1 based on
position information obtained from the respective GNSS
receivers 5C and 5D and measurement information obtained
from the inertial measuring device 5E, etc.

The respective GNSS receivers 5C and 5D and the inertial
measuring device 5E are connected to the automated driving control part 40 so as to be capable of performing mutual
communication via CAN. The inertial measuring device 5E
has a three-axis gyroscope, a three-direction acceleration
sensor, etc. The positioning module 5F is structured with a
control program for positioning, etc., which is stored in a
non-volatile memory of the automated driving control part
40.

As positioning methods using GNSS, DGNSS (Differen-
tial GNSS), RTK-GNSS (Real Time Kinematic GNSS), etc.,
can be used. In the present embodiment, RTK-GNSS, which
has high accuracy and is suitable for measurement of a
movable object, is employed. Accordingly, the reference
station 9, which enables positioning by RTK-GNSS, is
installed at a known location in the periphery of the orchard.

As illustrated in FIG. 1 to FIG. 2, the reference station 9
is equipped with the GNSS antenna 9A which receives radio
waves transmitted from the multiple positioning satellites 8,
and the GNSS receiver 9B which utilizes the radio waves
received by the GNSS antenna 9A to measure the position of
the GNSS antenna 9A (hereinafter may be simply referred to
as the antenna position). The GNSS receiver 9B obtains
position correction information based on the measured
antenna position and the installation position of the refer-
ence station 9. The positioning unit 5 and the reference
station 9 are equipped with the communication modules 5G,
5H, and 9C which enable a wireless communication
between the respective GNSS receivers 5C and 5D of the
positioning unit 5 and the GNSS receiver 9B of the reference
station 9. Accordingly, each of the GNSS receivers 5C and
5D of the positioning unit 5 can receive position correction
information from the GNSS receiver 9B of the reference
station 9.

Each of the GNSS receivers 5C and 5D of the positioning
unit 5 corrects each antenna position measured by itself,
based on the position correction information obtained from
the GNSS receiver 9B of the reference station 9. Accord-
ingly, each of the GNSS receivers 5C and 5D can measure
the position (latitude, longitude, and altitude in the global
coordinate system) of each of the GNSS antennas 5A and 5B
with high accuracy. The positioning unit 5 has the GNSS
receivers 5C and 5D and the inertial measuring device 5E,
so that the inertial measuring device 5E can supplement a
decrease in positioning accuracy of the GNSS receivers 5C
and 5D, which is caused by deterioration of the surrounding
environment. The positioning unit 5 can correct the mea-
surement error, which is accumulated in the inertial mea-
suring device 5E, based on the antenna positions measured
by the GNSS receivers 5C and 5D. Although the respective
GNSS antennas 5A and 5B are arranged at the top part of the
vehicle body 1 so as to increase the reception sensitivity of
the respective GNSS antennas 5A and 5B, the positional
deviation of the respective antenna positions in the left-right
direction of the vehicle body relative to the target path P,
which is caused by rolling of the vehicle body 1, can be
corrected by the positioning unit 5, based on the installation
height of the respective GNSS antennas 5A and 5B and the
roll angle of the vehicle body 1, which is measured by the
inertial measuring device 5E. Accordingly, the current posi-
tion, current direction, and attitude angles (yaw angle, roll
angle, and pitch angle) of the vehicle body 1 can be
measured by the positioning unit 5 with high accuracy.

As illustrated in FIG. 8, the respective GNSS antennas 5A
and 5B of the positioning unit 5 are installed in a separated
manner at front and rear two positions in the ceiling part of
the vehicle body 1 at a predetermined distance in the
front-rear direction of the vehicle body. The height positions
of the front and rear GNSS antennas 5A and 5B are set to the same height. Of the front and rear GNSS antennas 5A and 5B, the front GNSS antenna 5A is included in the front antenna unit 15 together with the communication module 5G, etc., which are connected to the GNSS receiver 5C corresponding to the front GNSS antenna 5A. The rear GNSS antenna 5B is included in the rear antenna unit 16 together with the communication module 5H which is connected to the GNSS receiver 5D corresponding to this rear GNSS antenna 5B, the inertial measuring device 5E, the communication module 28 corresponding to the mobile communication terminal 3, etc. The positional relationship between the antennas of the front and rear GNSS antennas 5A and 5B and the installation height are stored in a non-volatile memory of the automated driving control part 40.

The positioning module 5F basically calculates the current position of the vehicle body 1 based on the rear antenna position measured by the rear GNSS receiver 5D of the front and rear antenna positions measured by the front and rear GNSS receivers 5C and 5D. In a case where only the positioning accuracy of the rear GNSS receiver 5D is reduced, the positioning module 5F calculates the current position of the vehicle body 1 based on the front antenna position measured by the front GNSS receiver 5C. Accordingly, the positioning module 5F can calculate the current position of the vehicle body 1 with high accuracy. Further, the automated driving control part 40 can make the work vehicle V perform automated driving according to the target path P, based on the highly accurate current position of the vehicle body 1, etc., which are calculated by the positioning module 5F.

For example, the current position of the vehicle body 1 calculated by the positioning module 5F can be set in a variety of ways, such as to the front end position at the center with respect to the left-right direction on the upper end of the vehicle body 1, the rear end position at the center with respect to the left-right direction on the upper end of the vehicle body 1, the middle position with respect to the front-rear direction at the center with respect to the left-right direction on the upper end of the vehicle body 1, the central position of the vehicle body 1, the position at the center of gravity of the vehicle body 1, the central position of turning in a spin-turning state, etc.

The positioning module 5F executes the direction calculation control in which the current direction of the vehicle body 1 is calculated based on the front and rear antenna positions measured by the front and rear GNSS receivers 5C and 5D.

As an explanation of the control operation of the positioning module 5F in the direction calculation control based on the flowchart of FIG. 10 and FIG. 11 to FIG. 13, the positioning module 5F firstly performs the coordinate conversion process (Step #1) in which the front and rear antenna positions p1 and p2 that are measured by the GNSS receivers 5C and 5D, respectively, are converted into the NED coordinate system where either one of the front and rear antenna positions (here, the rear antenna position p2) is the origin. Next, the positioning module 5F performs the tilt calculation process (Step #2, see FIG. 11) in which the tilt θL of the straight line L connecting the antennas is calculated with the X-axis (north: N) being 0 degrees, based on the difference Δx in the X-direction and the difference Δy in the Y-direction of the front antenna position p1 relative to the rear antenna position p2 in the NED coordinate system. Further, the positioning module 5F performs the tilt offset amount calculation process (Step #3, see FIG. 12) in which the tilt offset amount Δθ between the antennas in a case where the vehicle body 1 is facing true north (N) is calculated based on the positional relationship between the front and rear GNSS antennas 5A and 5B, which is stored in a non-volatile memory of the automated driving control part 40. Then, the positioning module 5F performs the direction calculation process (Step #4, see FIG. 13) in which the direction θv of the vehicle body 1 is calculated based on the difference between the tilt θL of the straight line L, which is obtained in the tilt calculation process, and the tilt offset amount Δθ between the antennas, which is obtained in the tilt offset amount calculation process.

In other words, in this work vehicle V, the positioning module 5F calculates the current direction of the vehicle body 1 based on the front and rear antenna positions, so that, unlike the case where the current direction of the vehicle body 1 is calculated based on a single antenna position, it is not necessary to calculate movement vectors of the vehicle body 1 in the process of calculating the current direction. Therefore, the current direction of the vehicle body 1 can be calculated with high accuracy even at the time of turning driving with a small turning radius, where it is difficult to calculate movement vectors of the vehicle body 1, and at the time where the driving of the vehicle body 1 is stopped, where movement vectors of the vehicle body 1 cannot be calculated.

In a case where the start of automated driving is commanded by a user's touch operation on the display device 3A of the mobile communication terminal 3, the automated driving control part 40 executes the automated driving control for making the vehicle body 1 (work vehicle V) perform automated driving according to the target path P, based on the target path P for spraying work which is stored in a non-volatile memory, positioning information which is obtained from the positioning module 5F, etc.

The automated driving control includes the command process for the engine, in which a control command related to the engine 12 is transmitted to the engine control part 41, the command process for an HST, in which a control command related to the HST 30 is transmitted to the HST control part 42, the command process for work, in which a control command related to the spray device 4 is transmitted to the work device control part 43, etc.

In the command process for the engine, the automated driving control part 40 transmits, to the engine control part 46A, an engine rotational speed changing command, etc., as an instruction for changing the engine rotational speed, based on the set engine rotational speed included in the target path P. The engine control part 46A executes the engine rotational speed control, etc., for changing the engine rotational speed in response to an engine rotational speed changing command transmitted from the automated driving control part 46F.

In the command process for an HST, the automated driving control part 40 transmits, to the HST control part 42, a driving state switching command as an instruction for switching the driving states based on the driving state of the vehicle body 1 which is included in the target path P, a vehicle speed changing command as an instruction for changing the vehicle speed based on the set vehicle speed which is included in the target path P, etc. The HST control part 42 executes the driving state switching control for controlling the operation of each HST 30 in response to a driving state switching command which is transmitted from the automated driving control part 40, a vehicle speed control for controlling the operation of each HST 30 in response to a vehicle speed changing command which is transmitted from the automated driving control part 40, etc.

In the command process for work, the automated driving control part 40 transmits, to the work device control part 43, a spraying pattern switching command as an instruction for switching the spraying patterns of the left and right liquid spray parts 4L and 4R based on the spraying patterns included in the respective work paths Pw of the target path P, a spraying starting command as an instruction for starting spraying a chemical or the like with the left and right liquid spray parts 4L and 4R based on the working start position included in the target path P, a spraying stopping command as an instruction for stopping spraying a chemical or the like with the left and right liquid spray parts 4L and 4R based on the working stop position included in the target path P, etc. The work device control part 43 executes the spraying control for controlling the state of spraying a chemical or the like with the left and right liquid spray parts 4L and 4R by controlling the operation of the valve unit 4G in response to the spraying pattern switching command, the spraying starting command, the spraying stopping command, or the like which is transmitted from the automated driving control part 40.

Although illustration in a drawing is omitted, the vehicle body 1 is equipped with various kinds of detection devices such as the first rotation sensor for detecting the output rotational speed of the engine 12, the left and right second rotation sensors for detecting the output rotational speed of the hydraulic motor 30B in each HST 30, the first remaining amount sensor for detecting the remaining amount of a chemical or the like in the storage tank 4A, and the second remaining amount sensor for detecting the remaining amount of fuel in the fuel tank 26.

Figure 14:
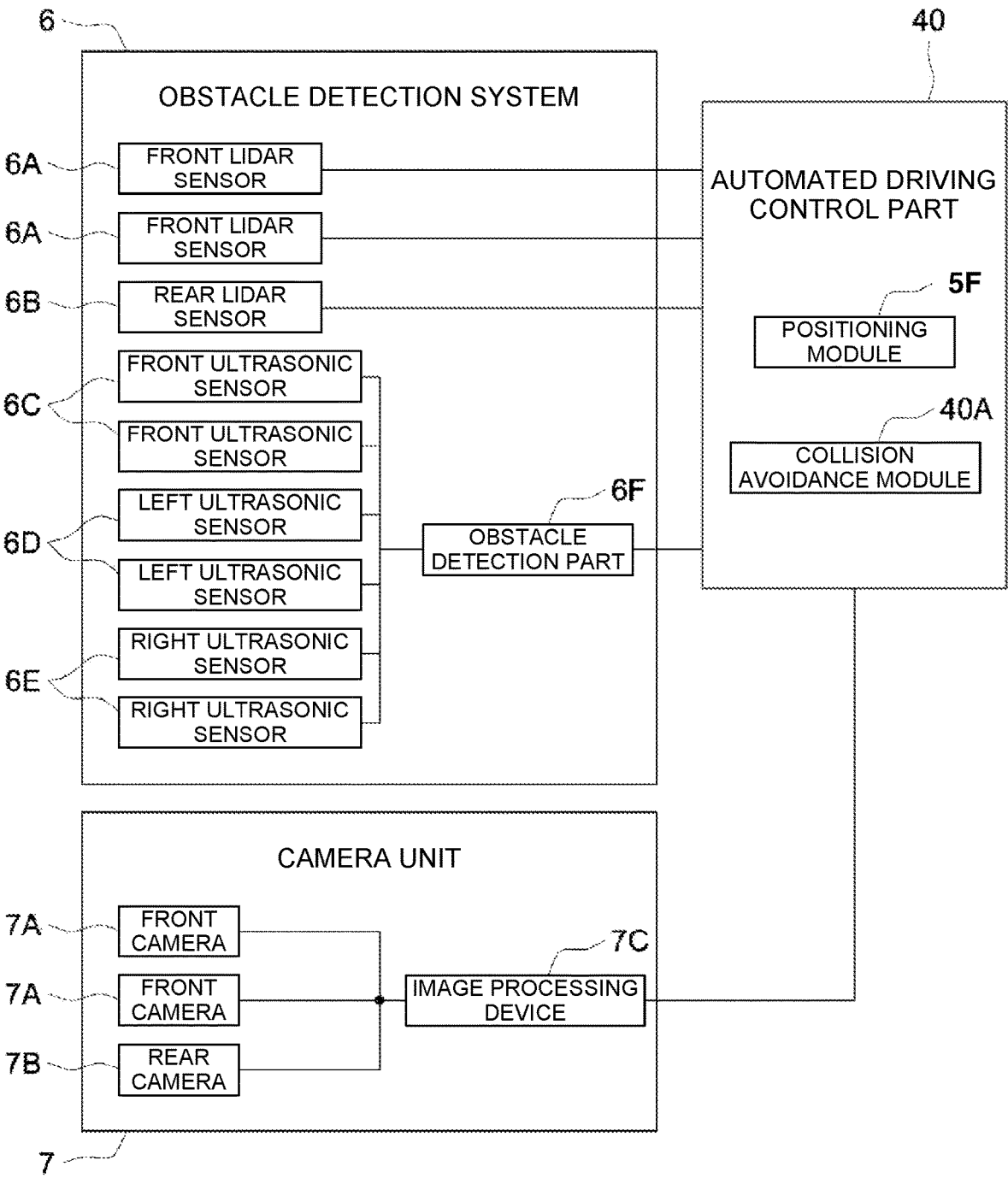
FIG. 14 is a block diagram illustrating a schematic configuration of a camera unit, etc.

As illustrated in FIG. 14, the obstacle detection system 6 includes the left and right front LiDAR sensors 6A and the single rear LiDAR sensor 6B. As illustrated in FIG. 3 to FIG. 4 and FIG. 6, of the left and right front LiDAR sensors 6A, the front LiDAR sensor 6A on the left side is arranged at the left-side front end part on the ceiling part of the vehicle body 1 and in a front-lowering posture so as to look down the front left side of the vehicle body 1 from the diagonally upper side. Accordingly, for the front LiDAR sensor 6A on the left side, a predetermined range on the front left side of the vehicle body is set as its measurement range. As illustrated in FIG. 3 to FIG. 4 and FIG. 7, the front LiDAR sensor 6A on the right side is arranged at the right-side front end part on the ceiling part of the vehicle body 1 and in a front-lowering posture so as to look down the front right side of the vehicle body 1 from the diagonally upper side. Accordingly, for the front LiDAR sensor 6A on the right side, a predetermined range on the front right side of the vehicle body is set as its measurement range. As illustrated in FIG. 5 to FIG. 7, the rear LiDAR sensor 6B is arranged at the rear end part at the center with respect to the left-right direction on the ceiling part of the vehicle body 1 and in a rear-lowering posture so as to look down the rear side of the vehicle body 1 from the diagonally upper side. Accordingly, for the rear LiDAR sensor 6B, a predetermined range on the rear side of the vehicle body is set as its measurement range.

Each of the LiDAR sensors 6A and 6B measures the distance from the respective LiDAR sensor 6A or 6B to each measurement point (measurement target object) in the measurement range by the TOF (Time Of Flight) method, in which the distance to the measurement point is measured based on the round-trip time for an emitted laser beam to return after reaching the measurement point. Each of the LiDAR sensors 6A and 6B performs scanning with a laser beam horizontally and vertically at high speed across the entire measurement range, respectively, so as to sequentially measure the distance to the measurement point at each scan angle (coordinates). Each of the LiDAR sensors 6A and 6B generates a distance image and extracts a group of measurement points that is estimated as an obstacle, based on measurement information such as the measured distance to each measurement point and the scan angle (coordinates) for each measurement point, in order to transmit the measurement information related to the extracted group of measurement points to the automated driving control part 40 as measurement information related to an obstacle.

As illustrate in FIG. 14, the obstacle detection system 6 includes the left and right front ultrasonic sensors 6C, the front and rear left ultrasonic sensors 6D, the front and rear right ultrasonic sensors 6E, and the single obstacle detection part 6F. As illustrated in FIG. 3 to FIG. 4 and FIG. 6 to FIG. 7, the left and right front ultrasonic sensors 6C are arranged at the left and right front end parts of the vehicle body 1 in a forward-facing posture. Accordingly, for the left and right front ultrasonic sensors 6C, predetermined left and right ranges on the front side of the vehicle body are set as their measurement ranges. As illustrated in FIG. 3, the front and rear left ultrasonic sensors 6D are arranged at the front and rear left end parts of the vehicle body 1 in a leftward-facing posture. Accordingly, for the front and rear left ultrasonic sensors 6D, predetermined front and rear ranges on the left outer side of the vehicle body 1 are set as their measurement ranges. The front and rear right ultrasonic sensors 6E are arranged at the front and rear right end parts of the vehicle body 1 in a rightward-facing posture. Accordingly, for the front and rear right ultrasonic sensors 6E, predetermined front and rear ranges on the right outer side of the vehicle body 1 are set as their measurement ranges.

The obstacle detection part 6F judges whether or not a measurement target object is present in the measurement ranges of the respective ultrasonic sensors 6C to 6E, based on transmission and reception of ultrasonic waves by the respective ultrasonic sensors 6C to 6E. The obstacle detection part 6F measures the distance from the respective ultrasonic sensors 6C to 6E to a measurement target object by the TOF (Time Of Flight) method, in which the distance to the measurement point is measured based on the round-trip time for an emitted ultrasonic wave to return after reaching the measurement point. The obstacle detection part 6F transmits the measured distance to the measurement target object and the direction of the measurement target object to the automated driving control part 40 as measurement information related to an obstacle.

Each of the LiDAR sensors 6A and 6B and the obstacle detection part 6F includes an electronic control unit in which a microcontroller or the like is mounted, various kinds of control programs stored in a non-volatile memory (e.g., an EEPROM such as a flash memory) of the microcontroller, etc. Each of the LiDAR sensors 6A and 6B and the obstacle detection part 6F is connected to the automated driving control part 40 via CAN so as to be capable of performing mutual communication.

As illustrated in FIG. 2 and FIG. 14, the automated driving control part 40 includes the collision avoidance module 40A that avoids the possibility that the work vehicle V collides with an obstacle, based on measurement information related to an obstacle, which is obtained from the respective LiDAR sensors 6A and 6B and the obstacle detection part 6F.

As illustrated in FIG. 14, the camera unit 7 is equipped with the left and right front cameras 7A which capture images of the front side of the vehicle body 1, the single rear camera 7B which captures an image of the rear side of the vehicle body 1, and the image processing device 7C which processes the images obtained from each of the cameras 7A and 7B. As illustrated in FIG. 3 to FIG. 4, FIG. 6, and FIG. 8, of the left and right front cameras 7A, the front camera 7A on the left side is arranged at the left-side front end part on the ceiling part of the vehicle body 1 and in a front-lowering posture so as to look down the front left side of the vehicle body 1 from the diagonally upper side. Accordingly, for the front camera 7A on the left side, a predetermined range on the front left side of the vehicle body is set as its image-capturing range. As illustrated in FIG. 3 to FIG. 4 and FIG. 7 to FIG. 8, the front camera 7A on the right side is arranged at the right-side front end part on the ceiling part of the vehicle body 1 and in a front-lowering posture so as to look down the front right side of the vehicle body 1 from the diagonally upper side. Accordingly, for the front camera 7A on the right side, a predetermined range on the front right side of the vehicle body is set as its image-capturing range. As illustrated in FIG. 5 to FIG. 8, the rear camera 7B is arranged at the rear end part at the center with respect to the left-right direction on the ceiling part of the vehicle body 1 and in a rear-lowering posture so as to look down the rear side of the vehicle body 1 from the diagonally upper side. Accordingly, for the rear camera 7B, a predetermined range on the rear side of the vehicle body is set as its image-capturing range.

The image processing device 7C includes an electronic control unit in which a microcontroller or the like is mounted, various kinds of control programs stored in a non-volatile memory (e.g., an EEPROM such as a flash memory) of the microcontroller, etc. On the image processing device 7C, a learning process for recognizing fruit trees, etc., in an orchard is performed. The image processing device 7C is connected to the automated driving control part 40 via CAN so as to be capable of performing mutual communication. The image processing device 7C processes information obtained from each of the cameras 7A and 7B, so as to generate a left front image of the vehicle body, a right front image of the vehicle body, and a rear image of the vehicle body, etc., and transmit them to the automated driving control part 40. The automated driving control part 40 transfers each of the transmitted images to the terminal control part 3B of the mobile communication terminal 3. Accordingly, it is possible to display the left front image of the vehicle body, the right front image of the vehicle body, the rear image of the vehicle body, etc., on the display device 3A of the mobile communication terminal 3. Then, the user can easily grasp the situation on the front side of the vehicle body and the situation on the rear side of the vehicle body by looking at each image displayed on the display device 3A.

Note that it is also possible that the camera unit 7 is included in the obstacle detection system 6. In this case, the detection of obstacles can be performed with high accuracy, based on information related to an obstacle which is obtained from the respective ultrasonic sensors 6C to 6E and the respective LiDAR sensors 6A and 6B with high positioning accuracy as well as information related to an obstacle which is obtained from the camera unit 7 with high accuracy of object determination.

That is, the above-described automated driving unit 2 includes the positioning unit 5, the obstacle detection system 6, the camera unit 7, the automated driving control part 40, the engine control part 41, the HST control part 42, the work device control part 43, etc. Further, with proper operation of these, it is possible to make the work vehicle V perform automated driving with accuracy according to the target path P, and it is also possible for the spray device 4 to properly perform the work of spraying a chemical or the like.

Figure 15:
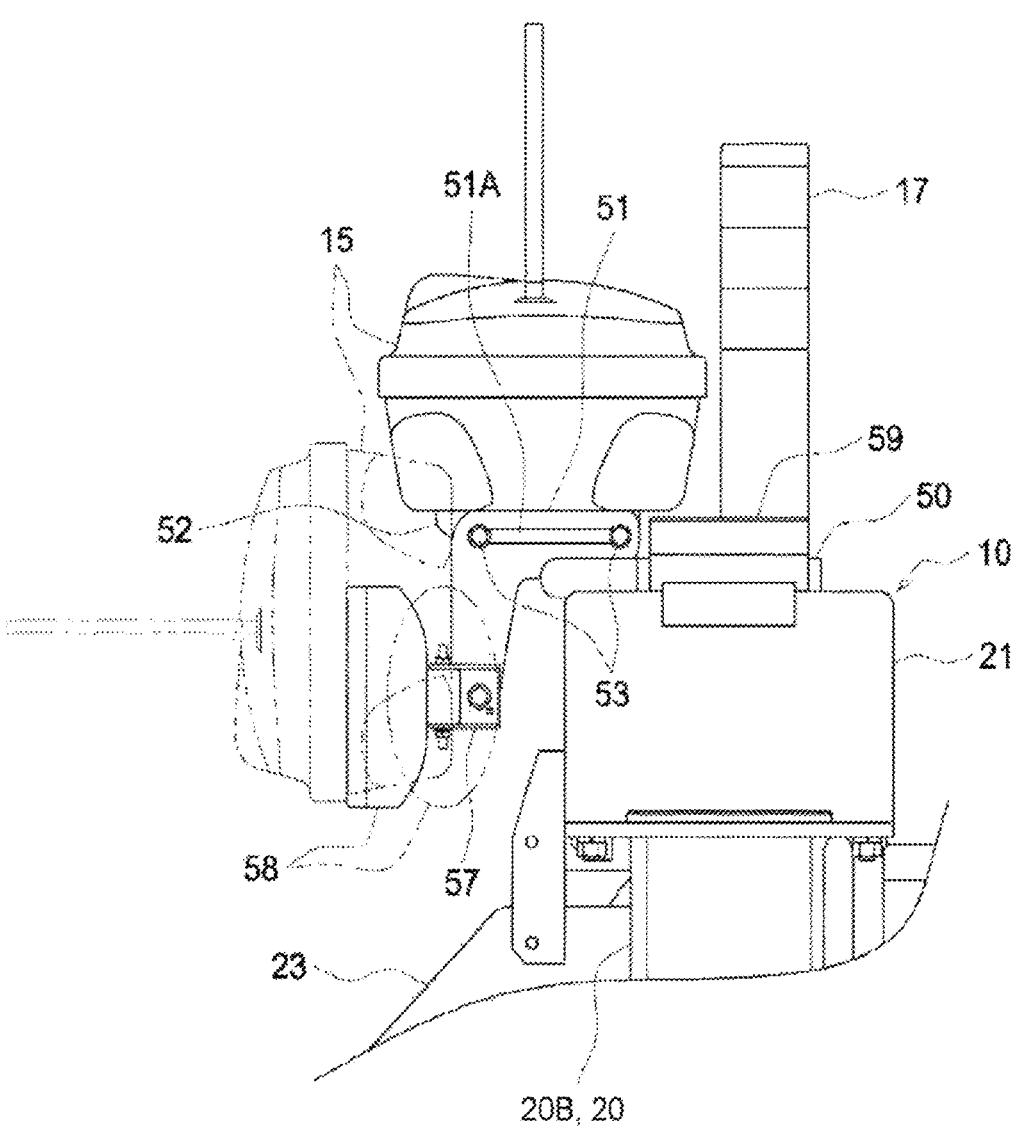
FIG. 15 is a side view of a main part illustrating a using position and a retracted position of an antenna unit.

As illustrated in FIG. 3 to FIG. 4, FIG. 8, and FIG. 15, the support member 50, which has a U-shape in plan view and supports the front antenna unit 15, is attached to the front cross member 21 of the vehicle body frame 10. As illustrated in FIG. 4 and FIG. 15, the support member 50 includes left and right support plates 51 formed in a downward-facing L-shape in a side view. As illustrated in FIG. 15, in the upper end part of each of the support plates 51, the long hole 51A is formed so as to extend in the front-rear direction of the vehicle body. To the respective support plates 51, the left and right brackets 52 arranged at the bottom part of the front antenna unit 15 are connected via the front-rear pair of bolts 53, etc., by utilizing those long holes 51A. With this configuration, by loosening the connection with each of the support plates 51 via the rear bolt 53, etc., after releasing the connection with each of the support plates 51 via the front bolt 53, etc., it is possible to reposition the front antenna unit 15 from the using position above the vehicle body, which is indicated with the solid lines in FIG. 15, to the retracted position in the front of the vehicle body, which is indicated with the dashed-two-dotted lines in FIG. 15.

As illustrated in FIG. 3 and FIG. 5 to FIG. 8, the support member 54, which has a U-shape in plan view and supports the rear antenna unit 16, is attached to the rear cross member 22 of the vehicle body frame 10. As illustrated in FIG. 5 to FIG. 7, the support member 54 includes left and right support plates 55 formed in a downward-facing L-shape in a side view. In the upper end part of each of the support plates 55, the long hole 55A is formed so as to extend in the front-rear direction of the vehicle body. To the respective support plates 55, left and right brackets (not illustrated in the drawings) arranged at the bottom part of the rear antenna unit 16 are connected via the front-rear pair of bolts 56, etc., by utilizing those long holes 55A. With this configuration, by loosening the connection with each of the support plates 55 via the rear bolt 56 etc., after releasing the connection with each of the support plates 55 via the rear bolt 56, etc., it is possible to reposition the rear antenna unit 16 from the using position above the vehicle body to the retracted position in the rear of the vehicle body.

As illustrated in FIG. 3 to FIG. 4, FIG. 8, and FIG. 15, the left and right front lights 58 are attached to the front lower part of the left and right support plates 51 via the left and right support brackets 57. The left and right support brackets 57 are connected to the left and right support plates 51 via bolts in a state of being able to adjust the angles thereof in the up-down direction. The left and right front lights 58 are connected to the left and right support brackets 57 via bolts in a state of being able to swing and change the position thereof in the left-right direction. With this configuration, it is possible for the left and right front lights 58 to adjust their lighting direction in the up-down direction and the left-right direction. Further, as illustrated in FIG. 15, in a case of repositioning the front antenna unit 15 from the using position, which is indicated with the solid lines in FIG. 15, to the retracted position, which is indicated with the dashed-two-dotted lines in FIG. 15, the front antenna unit 15 can be avoided from interfering with the left and right front lights 58 by repositioning the left and right front lights 58 from the forward-facing using position to the laterally-outward-facing retracted position.

As illustrated in FIG. 3 to FIG. 6, FIG. 8, and FIG. 15, the bracket 59 to which the above-described indicator light 17 is detachably attached is connected to the left side of the support member 50.

With the above-described configuration, in this work vehicle V, by changing the position of each of the antenna units 15 and 16 from the using position to the retracted position and removing the indicator light 17 from the bracket 59, it is possible to suppress occurrence of such an inconvenience that each of the antenna units 15 and 16 and the indicator light 17 make contact with other objects and get damaged in a case where the work vehicle V is retracted in a storage or the like or transported by a transport vehicle or the like.

As illustrated in FIG. 3 and FIG. 5 to FIG. 8, the left and right combination lamps 60 having stop lamps and back lamps are attached to the left and right support plates 55. The left and right combination lamps 60 are arranged in such positions so as not to interfere with the repositioning of the above-described rear antenna unit 16.

As illustrated in FIG. 3 to FIG. 4, FIG. 6, and FIG. 8, on the left side of the vehicle body 1, the power source switch 61 for controlling on/off of the power supply from the battery 13 to each electrical component such as each of the control parts 40 to 43 is attached to the bracket 59 that supports the indicator light 17. The step 62 for enabling the user to ride while standing is attached to the support plate 27 on the left side. The left cover member 18 is equipped with the upper cover 18A (see FIG. 3), which is positioned at the middle part of the left cover member 18 with respect to the front-rear direction so as to be swingable for opening and closing in the up-down direction. Further, the left side interior of the vehicle body 1 is equipped with the cross-swing-type operation lever 63 (see FIG. 6) which can be manually operated in a case where the upper cover 18A is held in the open position. The operation lever 63 is connected to the automated driving control part 40 via a sensor unit (not illustrated in the drawings), etc., which detects the operation direction and operation amount thereof. The automated driving control part 40 transmits the switching of the driving states of the vehicle body 1 to the HST control part 42 in accordance with the operation direction and operation amount of the operation lever 63, which are transmitted from the sensor unit. The HST control part 42 controls operation of each HST 30 in accordance with the switching of the driving states, which is transmitted from the automated driving control part 40.

That is, the user can stand on the step 62 of this work vehicle V so as to easily operate the power source switch 61. Further, the user can stand on the step 62 in a state where the upper cover 18A is held in the open position, so as to be capable of manual moving/driving by utilizing the operation lever 63.

The automated driving control by the automated driving control part 40 includes the vehicle body position correction process for correcting positional deviation in the driving reference position (current position of the vehicle body 1) of the vehicle body 1 (work vehicle V) relative to the target path P, which is caused by inclinations of the work site.

Figure 16:
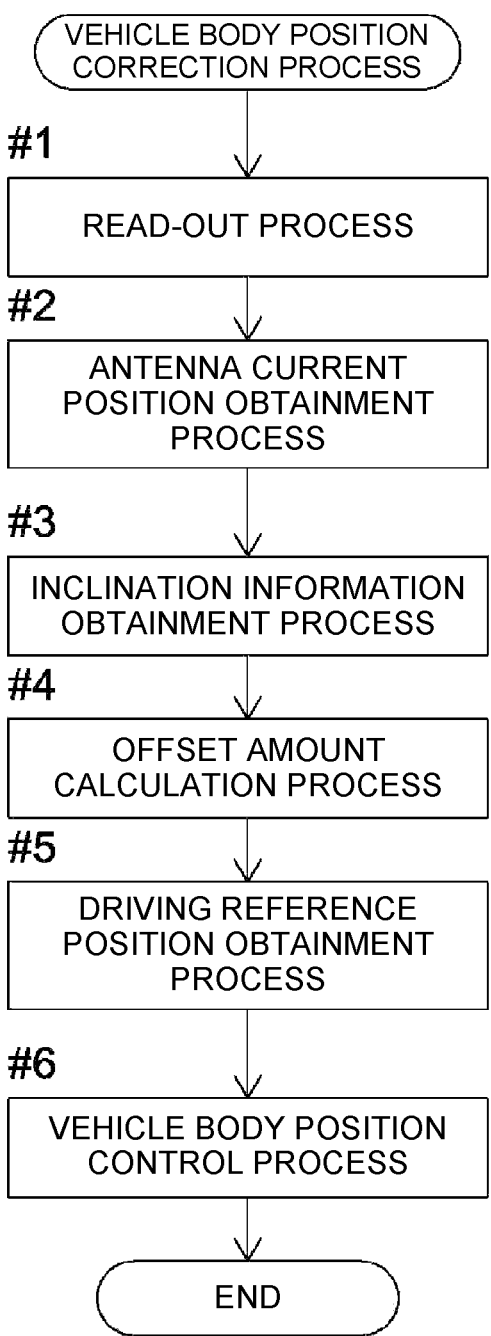
FIG. 16 is a flowchart of a vehicle body position correction process.

Hereinafter, the control operation of the automated driving control part 40 regarding the vehicle body position correction process will be explained based on the flowchart of FIG. 16 and the explanatory diagrams of FIG. 17 to FIG. 18. Note that, since the current position of the vehicle body 1 is calculated based on the rear antenna position p2 which is measured by the rear GNSS receiver 5D as described above in this work vehicle V, an explanation will be given of the control operation of the automated driving control part 40 in relation to the vehicle body position correction process based on the installation position of the rear GNSS antenna 5B (hereinafter referred to as the rear antenna installation position).

Figure 17:
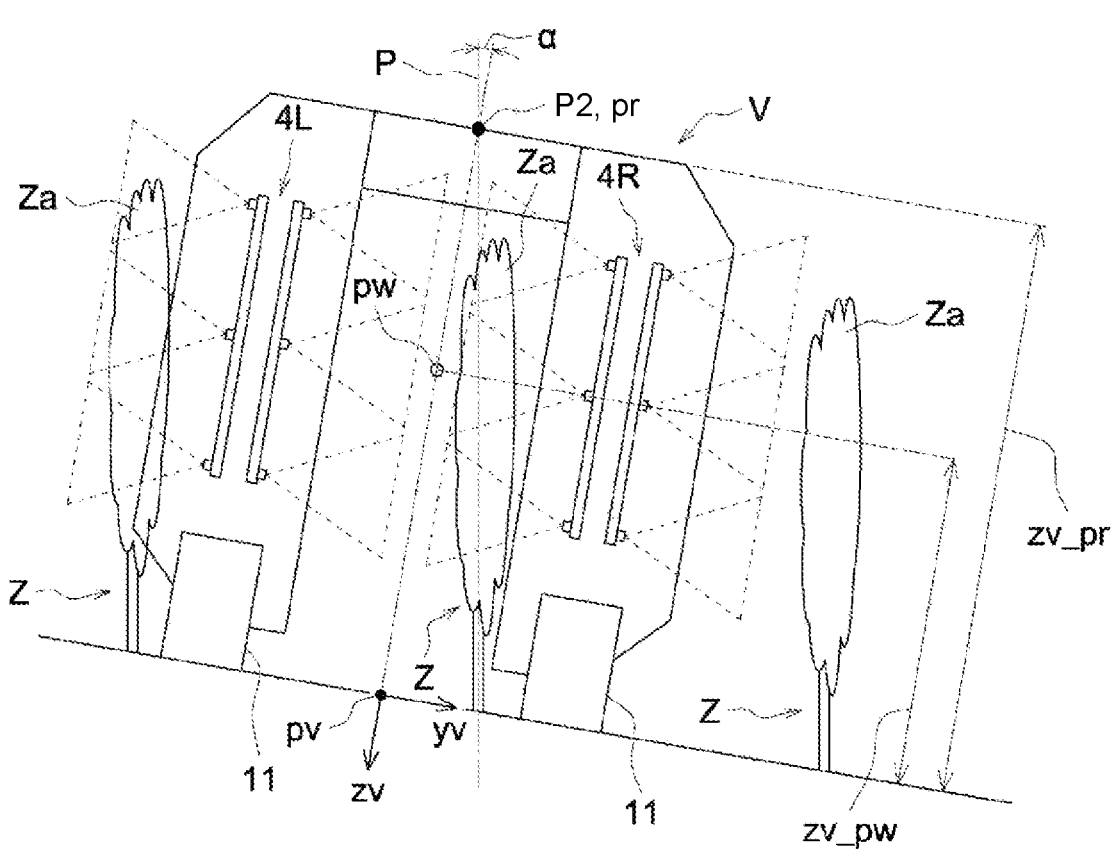
FIG. 17 is an explanatory diagram of the vehicle body position correction process.
Figure 18:
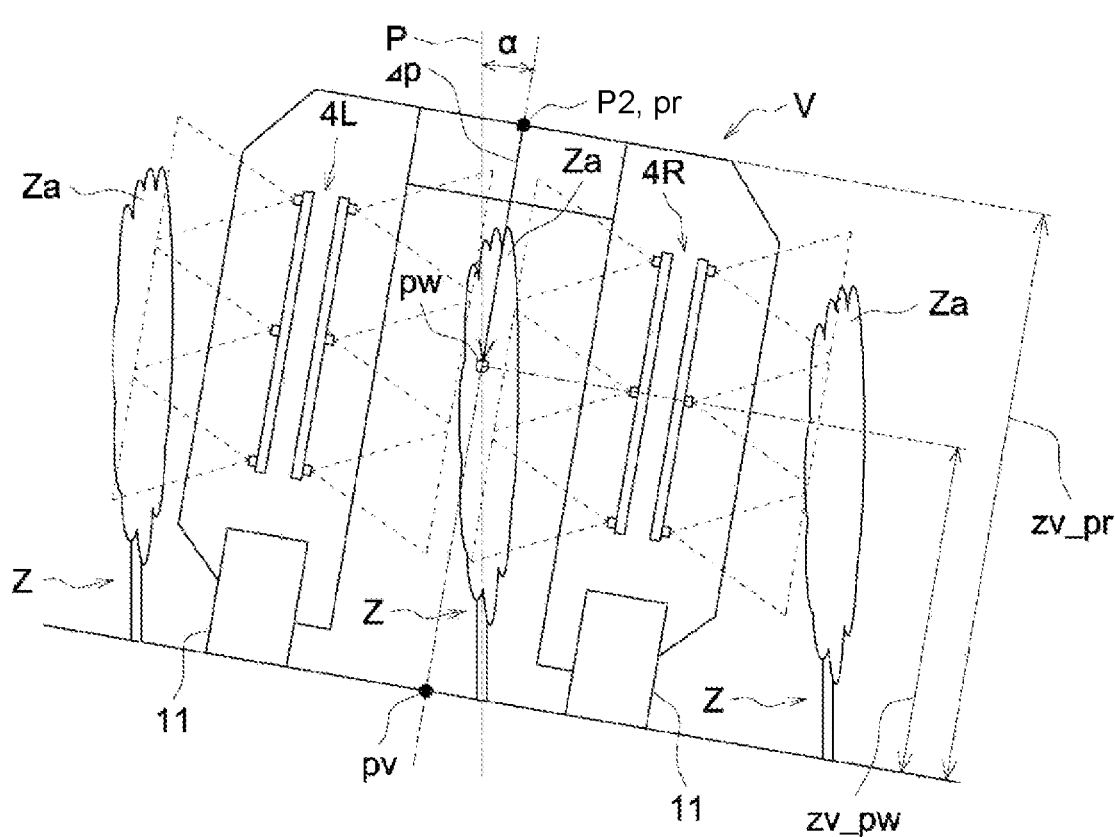
FIG. 18 is an explanatory diagram of the vehicle body position correction process.

The automated driving control part 40 performs the read-out process (Step #1) for reading out the rear antenna installation position pr of the vehicle body 1 which is stored in advance in its non-volatile memory (latitude, longitude, and altitude in the vehicle body coordinate system in which xv represents the forward direction of the vehicle body, yv represents the right direction of the vehicle body, and zv represents the downward direction of the vehicle body: zv_pr illustrated in FIG. 17 to FIG. 18) and work center pw of the spray device 4 (latitude, longitude, and altitude in the vehicle body coordinate system in which xv represents the forward direction of the vehicle body, yv represents the right direction of the vehicle body, and zv represents the downward direction of the vehicle body: zv_pw illustrated in FIG. 17 to FIG. 18). Note that, in this vehicle body position correction process, although the case in which the origin position of the vehicle body coordinate system is set to the vehicle body center pv illustrated in FIG. 17 to FIG. 18 is exemplified, the origin position of the vehicle body coordinate system can be defined as a given position.

The automated driving control part 40 performs the antenna current position obtainment process (Step #2) in which the rear antenna position p2 (latitude, longitude, and altitude in the global coordinate system) which is measured by the rear GNSS receiver 5D is converted into coordinates in the NED coordinate system (N: north, E: east, D: down) in order to obtain the antenna current position of the vehicle body 1.

The automated driving control part 40 performs the inclination information obtainment process (Step #3) to obtain inclination information of the vehicle body 1 (work vehicle V) which is obtained by the inertial measuring device 5E and inclination information (roll angle α, pitch angle ß, yaw angle λ: the deviation in the vehicle body driving direction relative to the north) of the vehicle body 1 which is calculated by the positioning unit 5 by use of the rear antenna position p2 measured by the rear GNSS receiver 5D.

The automated driving control part 40 performs the offset amount calculation process (Step #4) in which the offset amount (correction amount) Δp of the work center pw relative to the rear antenna installation position pr is calculated based on the rear antenna installation position pr and the work center pw of the spray device 4, which are read out in the read-out process, and the inclination information which is obtained in the inclination information obtainment process. Specifically, the automated driving control part 40 inputs the difference (vector pw-pr) of the rear antenna installation position from the work center pw into [Formula 2] of [Formula 1] in order to calculate the offset amount (correction amount) Δp of the work center pw relative to the rear antenna installation position pr in the NED coordinate system.

$$
\begin{pmatrix} N \\ E \\ D \end{pmatrix} = \begin{pmatrix} \cos\beta\cos\gamma & \sin\alpha\sin\beta\cos\gamma - \cos\alpha\sin\beta\cos\gamma + \\ & \cos\alpha\sin\gamma & \sin\alpha\sin\gamma \\ \cos\beta\sin\gamma & \sin\alpha\sin\beta\sin\gamma + \cos\alpha\sin\beta\sin\gamma - \\ & \cos\alpha\cos\gamma & \sin\alpha\cos\gamma \\ -\sin\beta & \sin\alpha\cos\beta & \cos\alpha\cos\beta \end{pmatrix} \begin{pmatrix} x_v \\ y_v \\ z_v \end{pmatrix}
$$

[Formula 1]

$$
\begin{pmatrix} x_v \\ y_v \\ z_v \end{pmatrix}
$$

[Formula 2]

The automated driving control part 40 performs the driving reference position obtainment process (Step #5) in which the offset amount that is calculated in the offset amount calculation process is added to the NED coordinates of the antenna current position of the vehicle body 1 that is obtained in the antenna current position obtainment process, in order to obtain the driving reference position (current position of the vehicle body 1). Then, the automated driving control part 40 performs the vehicle body position control process (Step #6) in which the position of the vehicle body 1 (work vehicle V) is controlled so that the driving reference position that is obtained in the driving reference position obtainment process is positioned on the target path P.

As described above, in this automated driving system for a work vehicle, the automated driving control part 40 calculates the offset amount Δp of the work center pw relative to the rear antenna installation position pr, based on altitude information of the work center pw of the spray device 4 and inclination information of the work vehicle V obtained by the inertial measuring device 5E, etc., in order to control the position of the work vehicle V relative to the target path P, based on this offset amount Δp.

That is, as illustrated in FIG. 17, in a case where the work vehicle V gets inclined in the roll direction, etc., due to inclinations or the like in the work site and thus the work center pw of the spray device 4 is displaced in the roll direction, etc., relative to the work target part Za such as fruits, branches, and leaves of the fruit trees Z during automated driving of the work vehicle V, the automated driving control part 40 calculates the offset amount Δp according to the displacement at the point in time, so as to control the position of the work vehicle V relative to the target path P as illustrated in FIG. 18, based on the offset amount Δp. Accordingly, it is possible to maintain the work center pw of the spray device 4 to the proper position relative to the work target part Za located away from the ground, regardless of inclinations or the like in the work site.

As a result, regardless of inclinations or the like in the work site, spraying work on fruits, branches, leaves, etc., located away from the ground can be properly performed by the spray device 4 of the work vehicle V during automated driving.

Further, as described above, although the spray device 4 is equipped with a space that allows fruits, branches, leaves, etc., of the fruit trees Z to pass through and the left and right liquid spray parts 4L and 4R that perform spraying work from the left and right sides on the fruits, branches, leaves, etc., of the fruit trees Z passing through this space, the automated driving control part 40 performs the vehicle body position correction process, in order to calculate the offset amount Δp with which the fruits, branches, leaves, etc., of the fruit trees Z can be prevented from contacting with the left and right liquid spray parts 4L and 4R when the fruits, branches, leaves, etc., of the fruit trees Z pass through the space of the spray device 4.

Accordingly, even if the work vehicle V is inclined in the roll direction, etc., and the work center pw of the spray device 4 is displaced in the roll direction, etc., relative to fruits, branches, leaves, etc. of the fruit tree Z, the automated driving control part 40 controls the position of the work vehicle V relative to the target path P, based on the above-described offset amount Δp, so that it is possible to avoid the left and right liquid spray parts 4L and 4R from contacting with the trunks of the fruit trees Z, which have low flexibility, while suppressing the left and right liquid spray parts 4L and 4R from contacting with the fruits, branches, leaves, etc., of the fruit trees Z, which have high flexibility. As a result, damage to the fruit trees Z caused by contacting with the left and right liquid spray parts 4L and 4R can be avoided.

Figure 19:
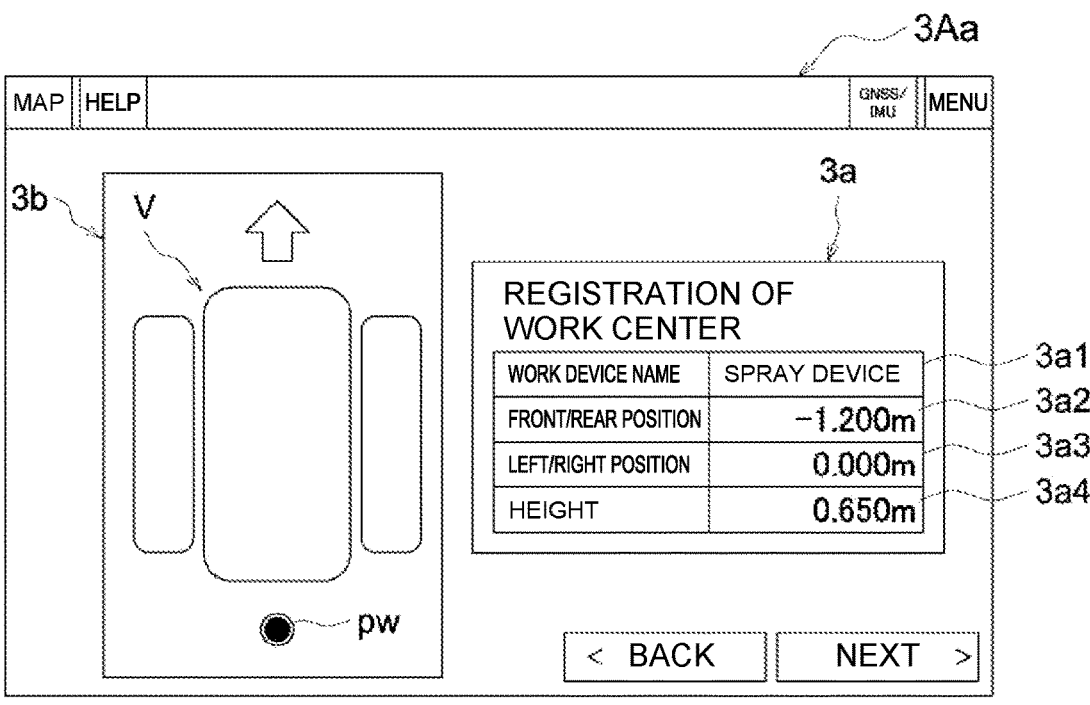
FIG. 19 is a block diagram illustrating a work center registration screen.

In a case where the work center registration screen 3Aa (see FIG. 19) is selected as the display screen of the display device 3A with a touch operation of the user performed on the display device 3A of the mobile communication terminal 3, the display control part 3Ba displays the work center registration screen 3Aa on the display device 3A. As illustrated in FIG. 19, the work center registration screen 3Aa includes the first area 3a, in which information related to the work center pw of the work device is input, and the second area 3b, in which the work center pw of the work device of the work vehicle V is displayed based on the information that is input to the first area 3a. The first area 3a includes the first input field 3a1 in which the name of the work device is input, the second input field 3a2 in which the distance from the vehicle body center pv to the work center pw in the front-rear direction of the vehicle body 1 is input, the third input field 3a3 in which the distance from the vehicle body center pv to the work center pw in the left-right direction of the vehicle body 1 is input, and the fourth input field 3a4 in which the height from the ground to the work center pw is input. As for the respective input fields 3a1 to 3a4, the left areas thereof are set as the input item display areas and the right areas thereof are set as the information input areas. In the information input area of the second input field 3a2, the distance in the forward direction of the vehicle body from the vehicle body center pv is input with a positive number, and the distance in the rearward direction of the vehicle body from the vehicle body center pv is input with a negative number. In the information input area of the third input field 3a3, the distance in the rightward direction of the vehicle body from the vehicle body center pv is input with a positive number, and the distance in the leftward direction of the vehicle body from the vehicle body center pv is input with a negative number. The information related to the work center pw of the work device which is input to each of the input fields 3a1 to 3a4 is stored in the respective non-volatile memories of the terminal control part 3B and the automated driving control part 40 as work center registration information.

Figure 20:
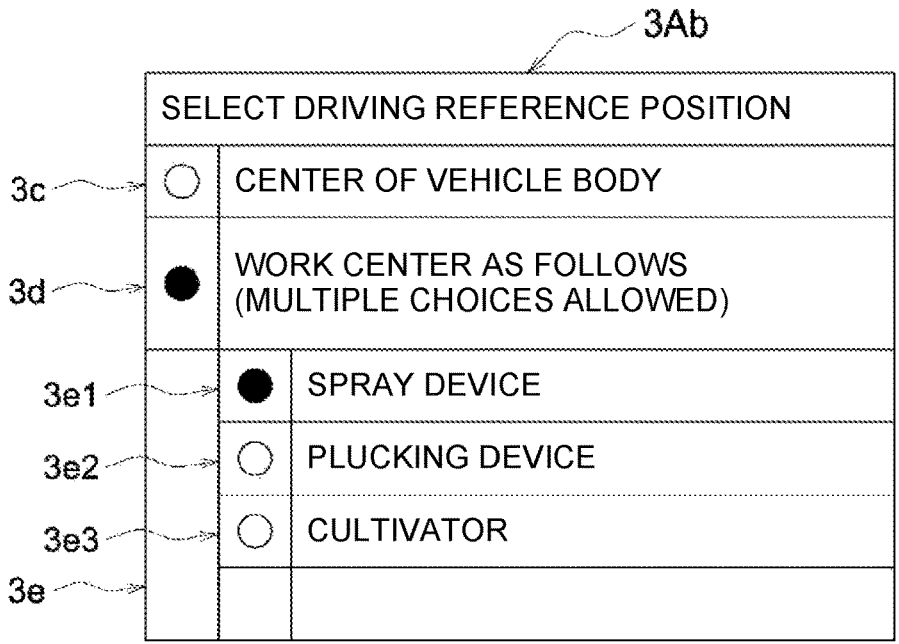
FIG. 20 is a block diagram illustrating a driving reference position selection screen.

In a case where the driving reference position selection screen 3Ab (see FIG. 20) is selected with a touch operation of the user in a state where the work center registration screen 3Aa is displayed on the display device 3A, the display control part 3Ba displays a pop-up of the driving reference position selection screen 3Ab on the display device 3A. As illustrated in FIG. 20, the driving reference position selection screen 3Ab includes the vehicle body center selection area 3c that enables selection of the vehicle body center pv as the driving reference position of the vehicle body 1, the work center selection area 3d that enables selection of the work center pw as the driving reference position of the vehicle body 1 (work vehicle V), and the individual center selection area 3e that enables selection of the work center pw of each work device in a case where the work vehicle V is equipped with multiple work devices. In the vehicle body center selection area 3c and the work center selection area 3d, the left end parts thereof are set as the selection operation parts, and the right-side areas thereof are set as the selection item display areas. The individual center selection area 3e includes multiple individual center selection fields 3e1 to 3e3 that enable selection of the work center pw of each work device in a case where the work vehicle V is equipped with multiple work devices. In each of the individual center selection fields 3e1 to 3e3, the left end parts thereof are set as the selection operation parts, and the right-side areas thereof are set as the selection item display areas. In the individual center selection area 3e, multiple work centers pw can be selected. Note that, FIG. 20 exemplifies the display state of the driving reference position selection screen 3Ab in a case where the spray device 4, a plucking device, and a cultivator are included as work devices for which the work centers pw can be selected.

In a case where the work center of the spray device 4 among the work centers pw of multiple work devices is selected in the individual center selection area 3e, the automated driving control part 40 performs the above-described vehicle body position correction process. Further, in a case where the work center of the plucking device is selected among the work centers pw of the multiple work devices in the individual center selection area 3e, the automated driving control part 40 performs the above-described vehicle body position correction process in a state where the work center of the spray device 4 has been changed to the work center of the plucking device, and, in a case where the work center of the cultivator is selected, the above-described vehicle body position correction process is performed in a state where the work center of the spray device 4 has been changed to the work center of the cultivator.

In this way, in a case where the work vehicle V is equipped with a contact-type work device such as a plucking device that plucks branches and leaves which are examples of the work target part Za, a non-contact-type work device such as the spray device 4 that sprays a chemical, water, or the like on fruits, branches, leaves, etc., which are examples of the work target part Za, and a work device such as a cultivator that acts on the soil between the fruit trees Z which is a work target part other than fruits, branches, leaves, etc., which are examples of the work target part Za, for example, if the work center of the plucking device is selected in the individual center selection area 3e, when the work vehicle V gets inclined in the roll direction, etc., due to inclinations or the like in the work site during automated driving of the work vehicle V, the automated driving control part 40 calculates the offset amount of the work center relative to the rear antenna installation position pr of the plucking device, based on altitude information of the work center of the plucking device and inclination information of the work vehicle V, in order to control the position of the work vehicle V relative to the target path P, based on this offset amount. Accordingly, the work center of the plucking device, which is a contact-type work device, can be maintained at a proper position relative to branches and leaves of the fruit trees Z, so that it is possible to avoid the possibility that the plucking device cannot properly perform plucking on the fruit trees Z due to displacement of the work center of the plucking device from the proper position relative to the branches and leaves of the fruit trees Z.

On the other hand, since the spray device 4 which is a non-contact-type work device and a cultivator whose work target part is the soil between the fruit trees Z are often not affected much in relation to the respective work target parts, as compared to a plucking device which is a contact-type work device, even if the work centers thereof deviates to some extent from the proper position relative to the work target parts, the predetermined work on the respective work target parts can be performed relatively in a proper manner.

That is, in a case where a work device whose work center pw needs to be positioned with high accuracy at a proper position relative to the work target part Za is included in the multiple work devices installed on the work vehicle V, if it is selected that the automated driving control part 40 calculates the offset amount based on altitude information or the like of the work center pw of the work device, even though multiple work devices are installed on the work vehicle V, it is possible to make the work device that requires high positional accuracy for the work target part Za be able to perform the predetermined work on the work target part Za in a proper manner during automated driving of the work vehicle V regardless of inclinations or the like in the work site, whereas it is also possible to make the other work devices be able to perform the predetermined work on the work target parts relatively in a proper manner during automated driving of the work vehicle V regardless of inclinations or the like in the work site.

In a case where the work centers pw of multiple work devices are selected in the individual center selection area 3e, in the above-described vehicle body position correction process, the automated driving control part 40 calculates the offset amount of the average work center relative to the rear antenna installation position pr, based on the average work center of the selected multiple work devices, and controls the position of the vehicle body 1 relative to the target path P, based on the offset amount of this average work center.

Specifically, for example, in a case where the work center of the spray device 4 and the work center of a plucking device are selected in the individual center selection area 3e, in the read-out process of the vehicle body position correction process, the automated driving control part 40 reads out the rear antenna installation position pr of the vehicle body 1 (latitude, longitude, and altitude of the coordinate system of the vehicle body), the work center of the spray device 4 (latitude, longitude, and altitude of the coordinate system of the vehicle body), and the work center of the plucking device (latitude, longitude, and altitude of the coordinate system of the vehicle body), which are stored in advance in a non-volatile memory.

Then, the automated driving control part 40 performs the average work center calculation process in which the average work center of the spray device 4 and the plucking device is calculated, then performs the antenna current position obtainment process and the inclination information obtainment process, and then performs the offset amount calculation process in which the offset amount of the average work center is calculated, based on the rear antenna installation position which is read out in the read-out process, the average work center which is obtained in the average work center calculation process, and the inclination information which is obtained in the inclination information obtainment process.

Thereafter, the automated driving control part 40 performs the driving reference position obtainment process in which the offset amount of the average work center that is calculated in the offset amount calculation process is added to the NED coordinates of the antenna current position of the vehicle body 1 that is obtained in the antenna current position obtainment process, in order to obtain the driving reference position (current position of the vehicle body 1). Then, the automated driving control part 40 performs the vehicle body position control process in which the position of the vehicle body 1 is controlled so that the driving reference position that is obtained in the driving reference position obtainment process is positioned on the target path P.

Further, for example, in a case where the work center of the spray device 4, the work center of a plucking device, and the work center of a cultivator are selected in the individual center selection area 3e, in the read-out process of the vehicle body position correction process, the automated driving control part 40 reads out the rear antenna installation position pr of the vehicle body 1 (latitude, longitude, and altitude of the coordinate system of the vehicle body), the work center of the spray device 4 (latitude, longitude, and altitude of the coordinate system of the vehicle body), the work center of the plucking device (latitude, longitude, and altitude of the coordinate system of the vehicle body), and the work center of the cultivator (latitude, longitude, and altitude of the coordinate system of the vehicle body), which are stored in advance in a non-volatile memory.

Then, the automated driving control part 40 performs the average work center calculation process in which the average work center of the spray device 4, the plucking device, and the cultivator is calculated, then performs the antenna current position obtainment process and the inclination information obtainment process, and then performs the offset amount calculation process in which the offset amount of the average work center is calculated, based on the rear antenna installation position which is read out in the read-out process, the average work center which is obtained in the average work center calculation process, and the inclination information which is obtained in the inclination information obtainment process.

Thereafter, the automated driving control part 40 performs the driving reference position obtainment process in which the offset amount of the average work center that is calculated in the offset amount calculation process is added to the NED coordinates of the antenna current position of the vehicle body 1 that is obtained in the antenna current position obtainment process, in order to obtain the driving reference position (current position of the vehicle body 1). Then, the automated driving control part 40 performs the vehicle body position control process in which the position of the vehicle body 1 is controlled so that the driving reference position that is obtained in the driving reference position obtainment process is positioned on the target path P.

In this way, in a case where the work centers pw of multiple work devices are selected in the individual center selection area 3e, if the work vehicle V gets inclined in the roll direction, etc., due to inclinations of the work site during automated driving of the work vehicle V, the automated driving control part 40 calculates the offset amount based on the altitude information of the average work center (average altitude information), the inclination information of the work vehicle V, etc., in order to control the position of the work vehicle V relative to the target path P, based on this offset amount. Accordingly, it is possible to avoid the possibility that the work center wp of any of the work devices greatly deviates from the proper position relative to the corresponding work target part or the like due to the influence of inclinations or the like in the work site.

As a result, even if the work vehicle V is equipped with multiple work devices having different altitude information, etc., the respective predetermined work on the work target parts corresponding to the respective work devices can be performed relatively in a proper manner during automated driving of the work vehicle V, regardless of inclinations or the like in the work site.

Other Embodiments

Explanations will be given of other embodiments of the present invention. Note that the configuration of each of the other embodiments explained below can, not only be applied independently, but also be applied in combination with the configuration of another embodiment.

(1) For example, it is also possible that the work vehicle V is configured as an electric model which is equipped with left and right electric motors, instead of the engine 12 and the pair of HSTs 30, for independently driving the left and right crawlers 11.

(2) It is also possible that the work vehicle V is configured so that the left-right width of the vehicle body 1 can be changed together with the left-right distance between the left and right crawlers 11.

ADDENDUM OF THE INVENTION

The first characteristic configuration of the present invention is an aspect that an automated driving system for a work vehicle is equipped with an inertial measuring device, which obtains inclination information of the work vehicle, and an automated driving control part, which makes the work vehicle perform automated driving according to a target path, wherein the work vehicle is equipped with a work device that performs a predetermined work on a work target part that is located away from a ground, and the automated driving control part calculates an offset amount based on altitude information of a work center of the work device as well as the inclination information, in order to control a position of the work vehicle relative to the target path, based on the offset amount.

According to the present configuration, in a case where the work vehicle gets inclined in the roll direction, etc., due to inclinations or the like in the work site and thus the work center of the work device is displaced in the roll direction, etc., relative to the work target part during automated driving of the work vehicle, the automated driving control part calculates the offset amount according to the displacement at the point in time, in order to control the position of the work vehicle relative to the target path, based on the offset amount. Accordingly, it is possible to maintain the work center of the work device to the proper position relative to the work target part located away from the ground, regardless of inclinations or the like in the work site.

As a result, regardless of inclinations or the like in the work site, the predetermined work on the work target part located away from the ground can be properly performed by the work device of the work vehicle during automated driving.

The second characteristic configuration of the present invention is an aspect that the work device is equipped with a space, which allows the work target part to pass through, and left and right work parts, which perform the predetermined work from left and right sides on the work target part that passes through the space, and the automated driving control part calculates the offset amount with which contacting of the work target part with the left and right work parts can be suppressed when the work target part passes through the space.

According to the present configuration, even though the work vehicle gets inclined in the roll direction, etc., due to inclinations or the like in the work site and thus the work center of the work device is displaced in the roll direction, etc., relative to the work target part during automated driving of the work vehicle, the automated driving control part controls the position of the work vehicle relative to the target path, based on the above-described offset amount, so that contacting of the work target part with the left and right work parts are suppressed.

This makes it easier to avoid the possibility that the work target part is damaged by contacting with the left and right work parts in a case where the work target part is fruits or tea leaves, for example. Further, the possibility that the trunk of a fruit tree or the like makes contact with the left and right work parts can be avoided.

The third characteristic configuration of the present invention is an aspect that the work vehicle is equipped with multiple work devices of which the altitude information is different from each other, and the automated driving control part uses average altitude information of the multiple work devices as the altitude information, in order to calculate the offset amount.

According to the present configuration, in a case where the work vehicle gets inclined in the roll direction, etc., due to inclinations or the like in the work site and thus the work center of each work device is displaced in the roll direction, etc., relative to the work target part during automated driving of the work vehicle, the automated driving control part calculates the offset amount based on the above-described average altitude information and the inclination information, in order to control the position of the work vehicle relative to the target path, based on the calculated offset amount. Accordingly, it is possible to avoid the possibility that the work center of any of the work devices greatly deviates from the proper position relative to the corresponding work target part due to the influence of inclinations or the like in the work site.

As a result, even if the work vehicle is equipped with multiple work devices of which the altitude information is different from each other, the respective predetermined work on the work target parts corresponding to the respective work devices can be performed relatively in a proper manner during automated driving of the work vehicle, regardless of inclinations or the like in the work site.

The fourth characteristic configuration of the present invention is an aspect that the work vehicle is equipped with multiple work devices of which the altitude information is different from each other, and the automated driving control part calculates the offset amount, based on the altitude information of one of the multiple work devices.

According to the present configuration, for example, in a case where the work vehicle is equipped with a contact-type work device such as a plucking device that plucks branches and leaves, which are examples of the work target part, and a non-contact-type work device such as a spray device that sprays a chemical, water, or the like on fruits, branches, leaves, etc., which are examples of the work target part, if the automated driving control part calculates the offset amount based on the altitude information of the work center of the contact-type work device as well as the above-described inclination information, it is possible to maintain the work center of the contact-type work device to the proper position relative to the work target part even through the work vehicle gets inclined in the roll direction, etc., due to inclinations or the like in the work site during automated driving of the work vehicle. Accordingly, it is possible to avoid the possibility that the work center of the contact-type work device deviates from the proper position relative to the work target part and thus the predetermined work by the contact-type work device on the work target part cannot be properly performed.

On the other hand, even if the work center of the non-contact-type work device deviates to some extent from the proper position relative to the work target part, there is often not much influence on the work target part, as compared with the contact-type work device, and thus the predetermined work on the work target part can be performed relatively in a proper manner.

In this way, in a case where a work device whose work center needs to be positioned with high accuracy at a proper position relative to the work target part is included in the multiple work devices installed on the work vehicle, if the automated driving control part calculates the offset amount based on altitude information of the work center of the work device, even though multiple work devices are installed on the work vehicle, it is possible to make the work device that requires high positional accuracy relative to the work target part be able to perform the predetermined work on the work target part in a proper manner during automated driving of the work vehicle regardless of inclinations or the like in the work site, whereas it is also possible to make the other work devices be able to perform the predetermined work on the work target parts relatively in a proper manner during automated driving of the work vehicle regardless of inclinations or the like in the work site.

The invention claimed is:

1. An automated driving system for a work vehicle comprising an inertial measuring device, which obtains inclination information of the work vehicle, and an automated driving control part, which makes the work vehicle perform automated driving according to a target path, wherein the work vehicle is equipped with a work device that performs a predetermined work on a work target part that is located away from a ground, and the automated driving control part calculates an offset amount based on altitude information of a work center of the work device as well as the inclination information, in order to control a position of the work vehicle relative to the target path, based on the offset amount.

2. The automated driving system for the work vehicle according to claim 1, wherein the work device is equipped with a space, which allows the work target part to pass through, and left and right work parts, which perform the predetermined work from left and right sides on the work target part that passes through the space, and the automated driving control part calculates the offset amount with which contacting of the work target part with the left and right work parts can be suppressed when the work target part passes through the space.

3. The automated driving system for the work vehicle according to claim 1, wherein the work vehicle is further equipped with a plurality of work devices of which the altitude information is different from each other, and the automated driving control part uses average altitude information of the plurality of work devices as the altitude information, in order to calculate the offset amount.

4. The automated driving system for the work vehicle according to claim 1, wherein the work vehicle is further equipped with a plurality of work devices of which the altitude information is different from each other, and the automated driving control part calculates the offset amount, based on the altitude information of one of the plurality of work devices.

* * * * *